(12) United States Patent　　(10) Patent No.: US 12,386,942 B2
Ellis, Jr. et al.　　(45) Date of Patent: *Aug. 12, 2025

(54) AUTHENTICATION USING ANALOG SIGNAL CHALLENGE

(71) Applicant: LEXMARK INTERNATIONAL, INC., Lexington, KY (US)

(72) Inventors: James Howard Ellis, Jr., Lexington, KY (US); Timothy John Rademacher, Ricmond, KY (US); Jennifer Topmiller Williams, Lexington, KY (US)

(73) Assignee: LEXMARK INTERNATIONAL, INC., Lexington, KY (US)

(*) Notice: Subject to any disclaimer, the term of this patent is extended or adjusted under 35 U.S.C. 154(b) by 526 days.

This patent is subject to a terminal disclaimer.

(21) Appl. No.: 17/850,032

(22) Filed: Jun. 27, 2022

(65) Prior Publication Data

US 2023/0367864 A1　Nov. 16, 2023

Related U.S. Application Data

(63) Continuation of application No. 17/740,476, filed on May 10, 2022.

(51) Int. Cl.
　　*G06F 21/00*　　(2013.01)
　　*G03G 15/08*　　(2006.01)
　　*G06F 21/44*　　(2013.01)

(52) U.S. Cl.
　　CPC ......... *G06F 21/44* (2013.01); *G03G 15/0863* (2013.01)

(58) Field of Classification Search
　　CPC .................. G06F 21/44; G03G 15/0863
　　See application file for complete search history.

(56) References Cited

U.S. PATENT DOCUMENTS

| | | | |
|---|---|---|---|
| 11,080,431 B1* | 8/2021 | Casto | G06F 21/76 |
| 11,736,805 B2* | 8/2023 | Itoh | H04N 23/75 |
| | | | 348/222.1 |
| 2007/0222650 A1* | 9/2007 | Park | H03M 9/00 |
| | | | 341/100 |
| 2009/0144520 A1* | 6/2009 | Taub | A63F 9/0468 |
| | | | 711/E12.014 |
| 2013/0187764 A1* | 7/2013 | Smith | H04L 9/3271 |
| | | | 340/10.42 |
| 2014/0040517 A1* | 2/2014 | Fister | G06F 12/0661 |
| | | | 710/110 |
| 2018/0027147 A1* | 1/2018 | Decugis | B41J 2/17543 |
| | | | 347/86 |
| 2019/0036538 A1* | 1/2019 | Tanaka | H03M 1/002 |
| 2019/0320078 A1* | 10/2019 | Foley | G03G 15/50 |

* cited by examiner

*Primary Examiner* — Rodman Alexander Mahmoudi

(57) ABSTRACT

Determining authenticity of a component in an imaging device includes generating an analog signal as an authentication challenge to the component. The component then generates a response to the authentication challenge by converting the analog signal into one or more digital values and capturing a derivative of the one or more digital values as the response. Authenticity of the component is determined by comparing the response with an expected response.

2 Claims, 15 Drawing Sheets

AUTHENTICATION USING ANALOG SIGNAL CHALLENGE

CROSS REFERENCES TO RELATED APPLICATIONS

This application claims priority as a continuation application of U.S. patent application Ser. No. 17/740,476, filed Jun. 10, 2022, having the same title.

FIELD OF THE INVENTION

The present disclosure relates generally to authentication schemes, and more particularly to authentication of security devices using an analog signal as an authentication challenge. Particular embodiments include methods of generating analog signal challenges and generating responses to the analog signal challenges for authenticating security devices in an imaging device.

BACKGROUND

In some imaging devices, supply items such as ink and toner cartridges are replaceable due to depletion of the consumable therein. In other supply items, such as imaging units and fusers, they are replaceable due to wear out of the physical mechanism. It is common to place security devices or integrated circuits with encryption and authentication circuits, based on digital technology, on supply items and connect these security devices with a controller in the printer. The controller usually contains a system-on-chip (SoC) and non-volatile memory (NVM) from which it executes firmware to direct the authentication of security devices on supply items to verify whether the supply items are genuine and authentic.

In some cases, another instance of the same security device (which may be referred to as a system security device) is also placed on the controller to reduce the likelihood of tampering during the authentication of security devices on supply items. In such an arrangement, the controller may verify the authenticity of the supply item by generating a cryptographic challenge, either directly from the SoC or through the system security device and sending the challenge to the security device on the supply item which, in turn, generates a response and returns the response to the controller. If the controller verifies that the security device on the supply item responds correctly to the challenge, the supply item is determined to be authentic. Otherwise, if the security device on the supply item responds incorrectly, the supply item is determined to be non-authentic and an enforcement action may be initiated. The enforcement action may consist of no notification to the user, notification to the user that a non-authentic supply item is installed or notification to the user that an unsupported supply item is installed.

One of the difficulties in developing security devices constructed with digital integrated circuit technology (e.g., NAND, NOR, INV, FLIP-FLOP, etc. standard logic gates), is that they are susceptible to being reverse engineered by an attacker copying the security device using chip delayering and imaging techniques to extract a logic netlist and memory contents. If a security device is reverse engineered and copied, a non-authentic device may be developed that produces the same digital behavior as the authentic device making it challenging to distinguish a non-authentic device from an authentic device. As a result, it is desirable to develop new methods of authenticating security devices on supply items beyond those digital methods known in the art.

The authentication system disclosed in U.S. patent application Ser. No. 17/469,601 entitled "Authentication Using Current Drawn by Security Device" introduced the use of current drawn by a security device in response to an execution of a command or a series of commands as an authentication parameter. Because the current drawn by the security device is expected to be a unique physical attribute of the security device, the current drawn may be used in whole or in part to determine authenticity of the security device. Specifically, a current monitor circuit was used to convert the current drawn by the security device into an analog voltage when a trigger condition was detected. The analog voltage was then converted into a digital value by an analog-to-digital converter (ADC). The digital value was captured for a finite duration and stored in memory as the captured current profile. The captured current profile was then compared with the expected current profile (which was predetermined and stored in memory or dynamically generated or computed) and a determination was made of the authenticity of the security device on the supply item. The inventors recognize a need to provide additional methods for authentication of security devices on supply items.

SUMMARY

The foregoing and other are solved by using analog signals suitable for authentication of security devices on supply items. In one embodiment, a method is disclosed for determining authenticity of a component in an imaging device. The method includes generating an analog signal as an authentication challenge to the component. The component generates a response by converting the analog signal into one or more digital values and capturing a derivative of the one or more digital values as the response. The response is compared with an expected response to determine authenticity of the component. Authentication may be one-way authentication where a component authenticates another component, mutual authentication where two components authenticate each other, or self-authentication where a component authenticates itself. In one aspect, a component is a controller of the imaging device or a toner cartridge of the imaging device.

In another embodiment, a method is disclosed for generating an authentication challenge to a component of an imaging device for determining authenticity of the component. The method includes generating one or more random numbers and identifying one or more parameters stored in memory based on the one or more random numbers. An analog circuit is used to generate a random analog signal based on the one or more parameters and the random analog signal is used as the authentication challenge to the component.

In another embodiment, a method is disclosed for generating a response to an authentication challenge for determining authenticity of a component in an imaging device. The method includes receiving, by the component, an analog signal as the authentication challenge. The analog signal is converted into one or more digital values and a derivative of the one or more digital values is captured as the response to the authentication challenge.

In another embodiment, a security device for use on a supply item is disclosed. In one embodiment, the security device includes a first analog circuit for generating an authentication challenge when the security device receives a command to generate the authentication challenge. The first analog circuit generates the authentication challenge by converting one or more digital values into an analog signal and using the analog signal as the authentication challenge. The security device also includes a second analog circuit for generating a response to an analog signal authentication challenge when the security device is being authenticated using the analog signal authentication challenge. The second analog circuit generates the response by converting the analog signal authentication challenge into one or more digital values and capturing a derivative of the one or more digital values as the response.

DETAILED DESCRIPTION OF THE ILLUSTRATED EMBODIMENTS

The present disclosure provides analog methods to authenticate supply items that are based on placing integrated circuits with analog circuit technology, such as analog-to-digital converters (ADC), digital-to-analog converters (DAC), and operational amplifiers (OPAMP), on supply items and using these analog circuit features as part of the authentication process. Because these analog circuits have unique characteristics that are not easily copied with exactness (such as signal to noise ratio, offset and gain error, integral non-linearity, differential non-linearity, quantization error, analog voltage range, conversion rate, and digitized resolution), it is possible to improve the security of authentication of supply items by using integrated circuits with analog features that provide higher resistance to being reverse engineered and copied than by only using security chips with digital features.

Figure 1:
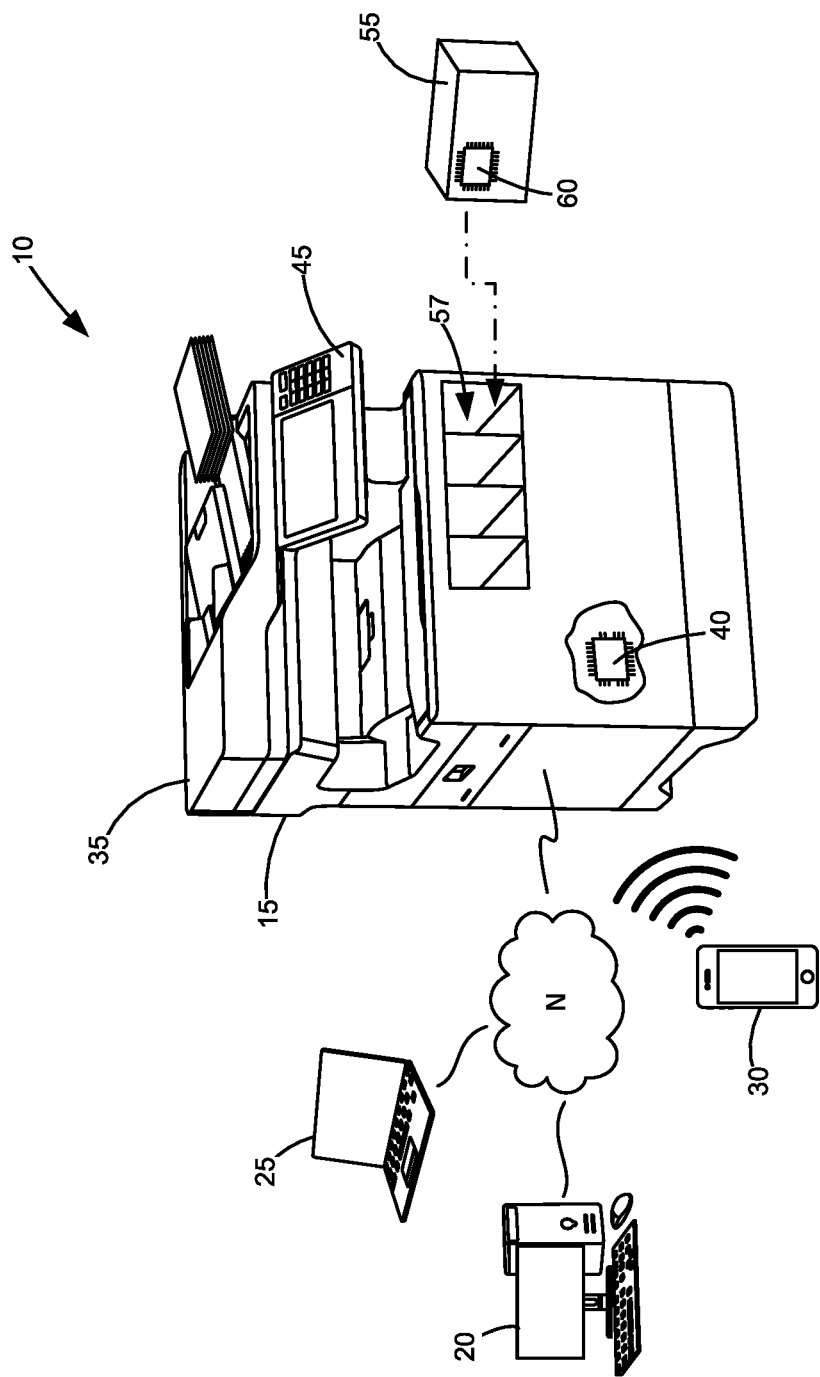
FIG. 1 illustrates an imaging system according to one example embodiment.

With reference to FIG. 1, a diagrammatic view of an imaging system 10 is shown according to an example embodiment. Imaging system 10 includes an imaging device 15 used for printing images on sheets of media. Image data of the image to be printed on a media sheet may be supplied to imaging device 15 from a variety of sources such as a computer 20, laptop 25, mobile device 30, scanner 35, or like computing device. The sources directly or indirectly communicate with imaging device 15 via wired and/or wireless connections. Imaging device 15 includes a controller 40 and a user interface 45. Controller 40 may include a processor and associated memory. In some example embodiments, controller 40 may be formed as one or more Application Specific Integrated Circuits (ASICs) or System-on-Chips (SoCs). Controller 40 may control the processing of print data. Controller 40 may also control the operation of a print engine during printing of an image onto a sheet of media.

In one example embodiment, imaging device 15 employs an electronic authentication scheme to authenticate consumable supply items and/or replaceable units installed in imaging device 15. In FIG. 1, a representative supply item 55, such as a toner cartridge or an imaging unit, is shown. Supply item 55 may be installed in a corresponding storage area 57 in imaging device 15. Supply item 55 includes an integrated circuit chip or security device 60 that communicates with controller 40 in imaging device 15. Controller 40 may initiate authentication challenges to verify authenticity of supply items 55. The authenticity is verified if the supply item 55 being authenticated generates an expected response to the authentication challenge. Otherwise, the supply item 55 may be detected as a clone or counterfeit and appropriate actions may be taken to protect against the use of supply item 55 in order to optimize performance of and/or prevent damage to imaging device 15.

Figure 2:
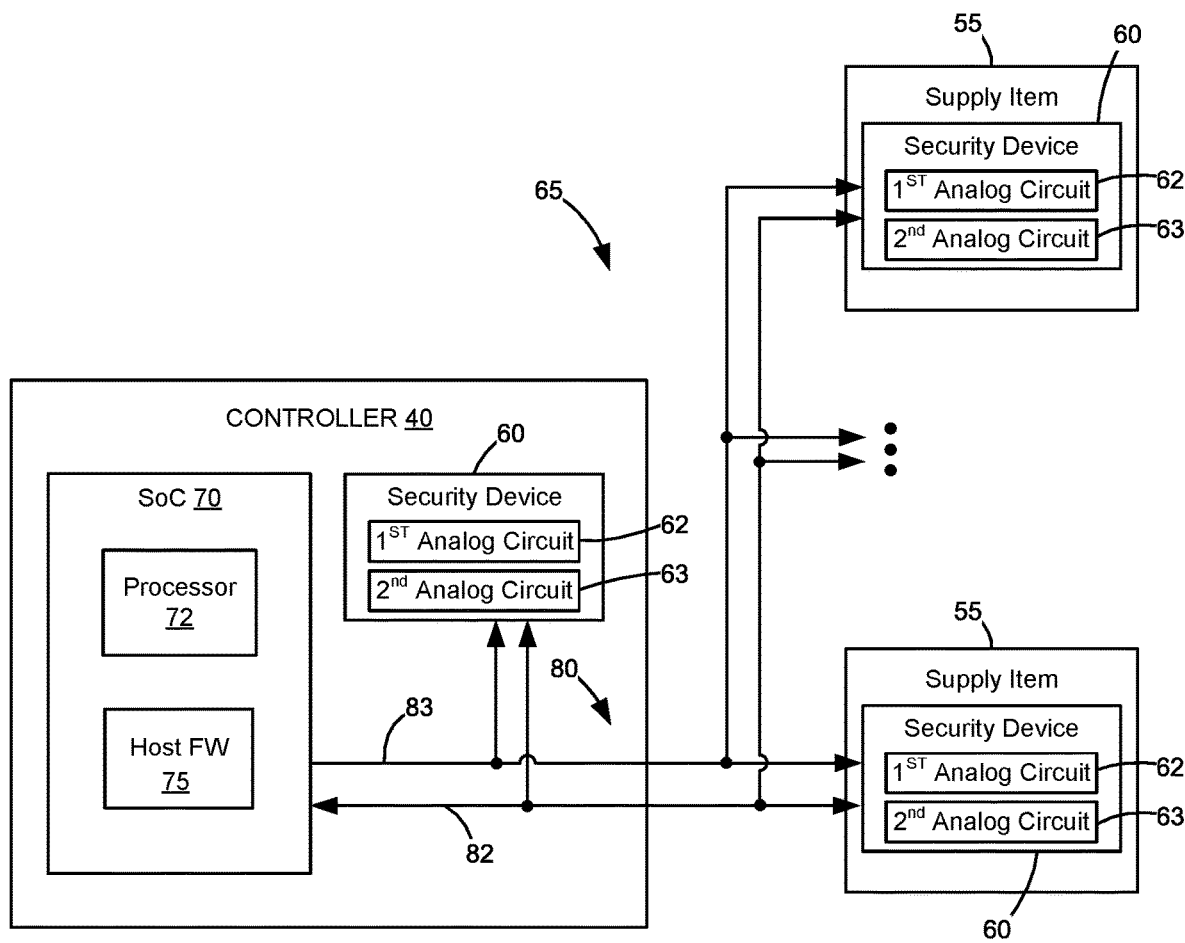
FIG. 2 is a block diagram of a shared bus system illustrating communication between a controller and a plurality of supply items according to one example embodiment.

FIG. 2 illustrates a shared bus system 65 in which controller 40 communicates with a number of security devices 60 in imaging device 15 and supply items 55. In the embodiment illustrated, controller 40 includes a System-on-Chip (SoC) 70 including a processor 72. SoC 70 initiates and controls passing of communications including data, addresses, clock signals, and other control signals on a shared bus 80. Shared bus system 65 may employ the Inter-Integrated Circuit ("I2C") protocol, although many other protocols can be utilized. One wire 82 of shared bus 80 carries data in a bidirectional manner, and the other wire 83 carries clock signals. While shared bus 80 is illustrated as a two-wire serial bus, shared parallel bus structures or other wired structures may be utilized in other example embodiments. In yet other example embodiments, structures that facilitate communication between controller 40 and supply items 55 may operate using wireless technology.

Host Firmware 75 running in SoC 70 is configured to initiate authentication methods for validating authenticity of one or more of security devices 60. To initiate authentication, SoC 70 is configured to command one security device 60 to generate an authentication challenge and send the authentication challenge to another security device 60 that is to be authenticated. Hereinafter, a security device 60 that receives a command from SoC 70 to generate an authentication challenge may be referred to as a security device challenge source 60, and a security device 60 to be authenticated may be referred to as a security device under authentication 60.

In the embodiment illustrated, security devices 60 are placed on supply item(s) 55 and on controller 40. Each security device 60 includes a first analog circuit 62 for converting one or more digital values into an analog signal and a second analog circuit 63 for converting an analog signal into one or more digital values. Using the first analog circuit 62 from one security device 60 (i.e., a security device challenge source 60), a random analog signal may be generated as an authentication challenge, where the analog signal is random in amplitude (voltage), frequency, and duration. The authentication challenge is sent to another security device 60 (i.e., a security device under authentication 60) which generates a response to the authentication challenge by using its second analog circuit 63 to convert the received analog signal into one or more digital values during a measurement interval. The measurement interval may begin with a programmable start condition and end after a programmable duration. A derivative of the converted digital values (which may be any arithmetical or logical transformation of the converted digital values) is captured as the actual response, and an authentication algorithm is used to compare the actual response to an expected response.

The expected response may be dynamically generated/computed or predetermined and statically stored in memory. A predetermined threshold may be used to verify the authenticity of a security device 60 on supply item 55 and/or on controller 40. For example, the security device under authentication 60 may be determined to be authentic when the comparison of the actual response with the expected response exceeds the predetermined threshold. Otherwise, the security device under authentication 60 may be determined to be non-authentic when the comparison does not exceed the predetermined threshold. Alternatively, reverse logic may be used for the comparison as desired. Host SoC 70 may command any of security devices 60 to generate an authentication challenge and send the generated authentication challenge to any of the other security devices 60. Accordingly, the authentication protocol may be any combination of one-way authentication, mutual authentication, and self-authentication, as discussed in greater detail below.

The analog signal that is generated by a security device challenge source 60 and sent as an authentication challenge to a security device under authentication 60 may be any DC signal (voltage varying in time from 0 volts to only a positive voltage, or from 0 volts to only a negative voltage) or AC signal (voltage varying in time from a negative voltage to a positive voltage) that may be generated with any combination of one or more analog circuits, such as (but not limited to) an output buffer, a digital-to-analog converter, or an operational amplifier and passive components (resistor, inductor, capacitor). Many different types of DC and AC analog signals may be generated as an authentication challenge including (but not limited to) voltage waveforms that are known in the art such as a square wave, ramp wave, triangle wave, sawtooth wave, pulse width modulated wave, rectified wave, sine wave, or complex wave, etc.

Figure 3:
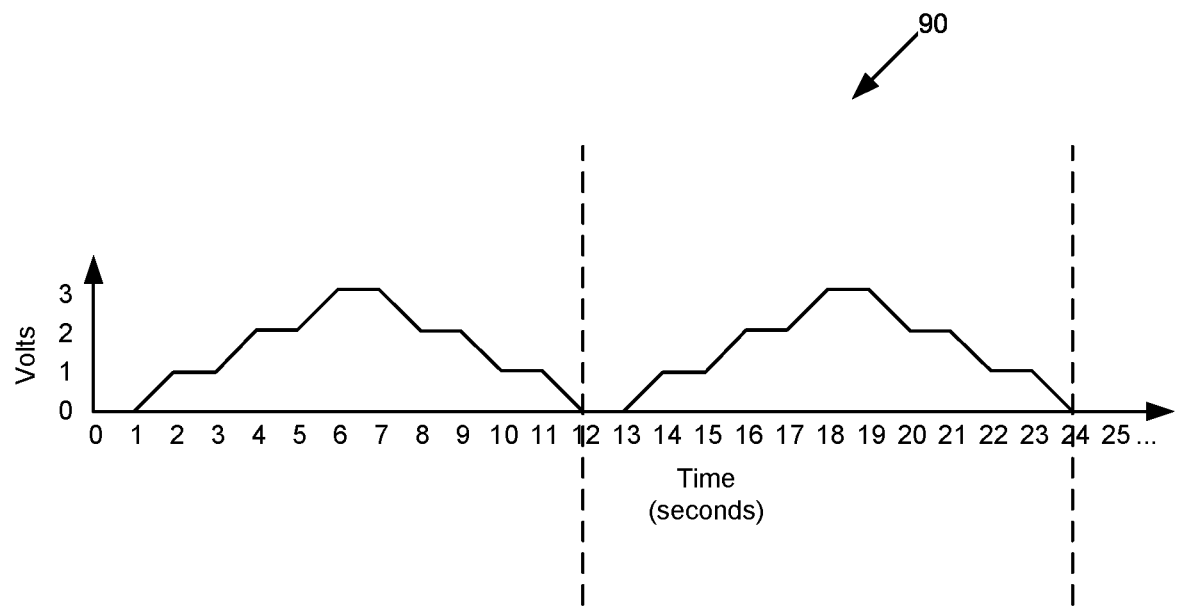
FIG. 3 shows an analog signal including a DC ramp used an example authentication challenge.
Figure 4:
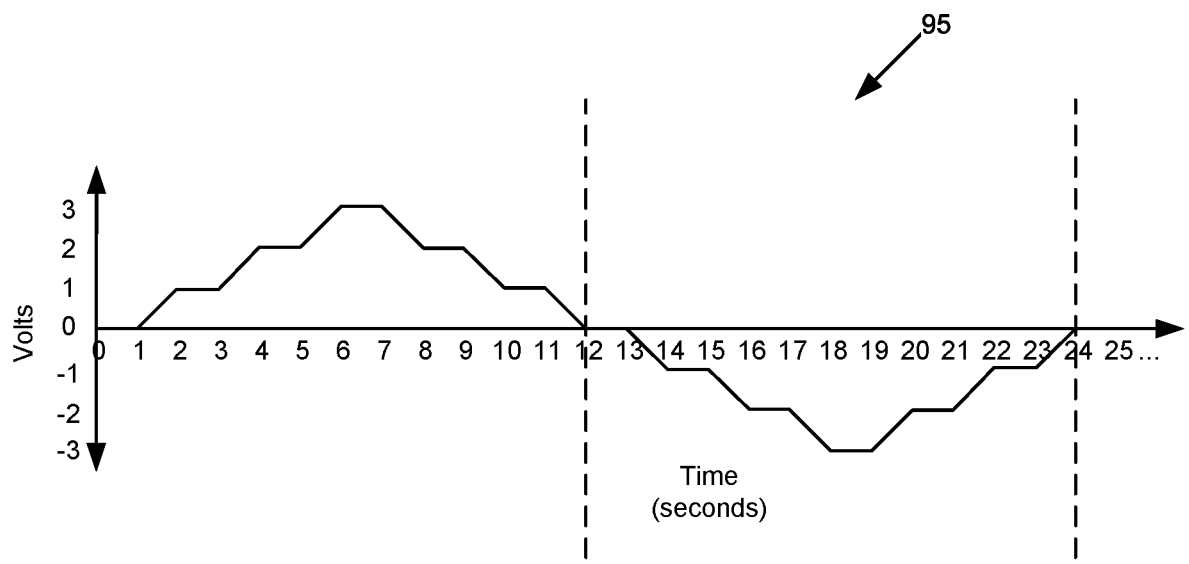
FIG. 4 shows an analog signal including an AC ramp used as an example authentication challenge.

FIG. 3 shows a first analog signal 90 used as an example authentication challenge. In this example, first analog signal 90 is a DC ramp wave that varies in 1 volt/second increments every other second with a peak-to-peak amplitude of 0 volts to 3 volts and having a period of 12 seconds. FIG. 4 shows a second analog signal 95 used as another example authentication challenge. In this example, analog signal 95 is an AC ramp wave that varies in 1 volt/second increments every other second with a peak-to-peak amplitude of −3 volts to 3 volts and a having a period of 24 seconds.

The security device 60 that receives an analog signal as an authentication challenge is configured to generate a correct response by accurately converting the analog signal into one or more digital values, and then correctly computing an arithmetical or logical operation on each converted digital value. To accurately convert the analog signal into the expected set of digital values, each security device 60 includes an input buffer circuit or an analog to digital converter circuit (see, for example, FIGS. 12-18) with specifications that match the characteristics of the analog signal. Example characteristics may include, but are not limited to, an input voltage range that matches a peak-to-peak range of analog signal, a sample frequency and conversion rate that is at least twice the highest frequency contained in the analog signal, a digital output resolution that matches the expected resolution, and compensation for offset, gain, and linearity conversion error. To compute the correct arithmetical or logical operation on the converted digital value, the security device 60 includes circuitry capable of executing arithmetical or logical operations according to parameters sent by the command from SoC 70 or parameters stored in the security device 60. Example arithmetical or logical operations may include, but are not limited to, a no-operation (no calculation), an addition, a subtraction, a multiplication, a division, an exponentiation, a logical shift, or an arithmetic shift.

Figure 5:
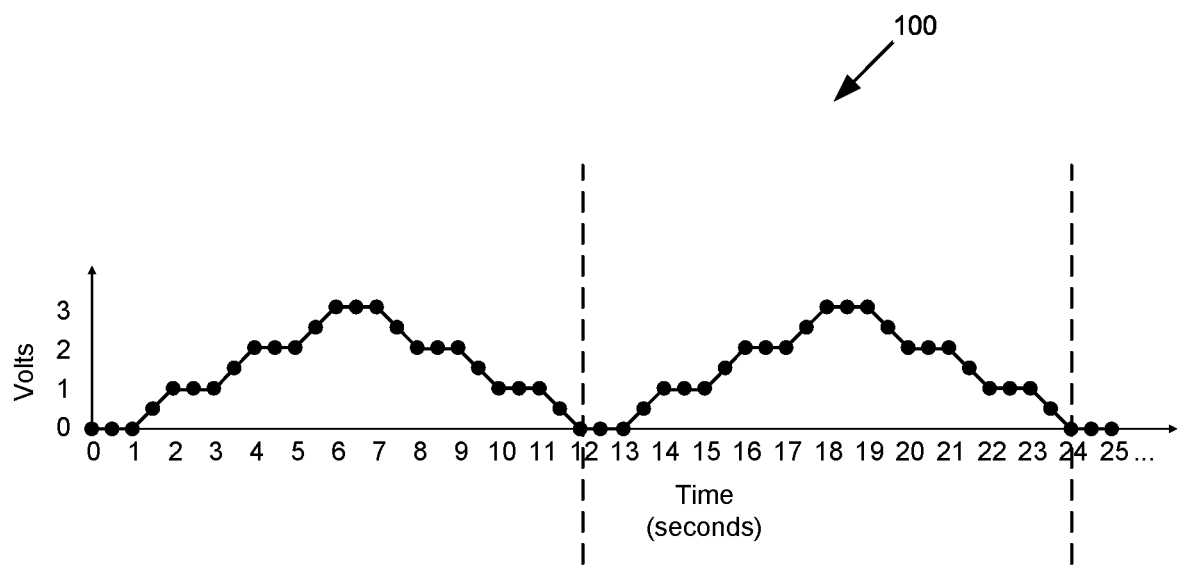
FIG. 5 shows an example converted signal by an authentic security device in response to the analog signal authentication challenge shown in FIG. 3.
Figure 6:
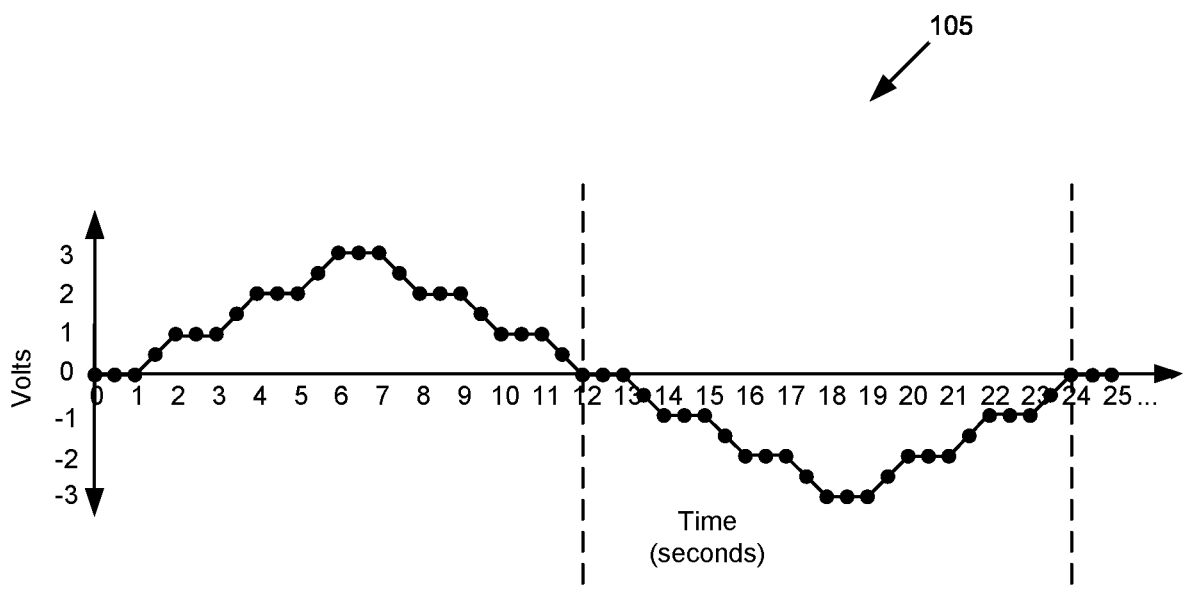
FIG. 6 shows an example converted signal by an authentic security device in response to the analog signal authentication challenge shown in FIG. 4.

As an example, an authentic security device 60 may include circuitry, such as an analog to digital converter (ADC) seen in FIGS. 12-18, capable of sampling the analog signal authentication challenges 90, 95 in FIGS. 3 and 4 at a rate of one sample every one-half second and/or capable of near zero conversion error in order to be capable of generating correctly converted signals 100, 105 shown in FIGS. 5 and 6, respectively, where the discrete samples are represented by the "dots" in the graph. An authentic security device 60 may include a rectifier circuit (not shown) of any kind that converts an AC signal into a DC signal before converting the rectified signal into a digital output consisting of only positive or negative voltages (including zero). The converted digital output may be enhanced by several techniques known in the art including, but not limited to, oversampling, averaging, interpolation, or decimation. After conversion and enhancement, the authentic security device 60 is configured to perform an arithmetical or logical computation on each digital value according to parameters stored in the security device to produce the correct response to the challenge.

In this example, an authentic security device 60 will be able to generate an actual response corresponding to the converted signal 100 shown in FIG. 5 in response to the DC analog signal authentication challenge 90 shown in FIG. 3 where no-operation is computed on the converted digital values. The actual response is illustrated as "dots" on the graph in FIG. 5 and consists of a data set of twenty-five 16-bit digital values at or very close to 0, 0, 0, 0.5, 1, 1, 1, 1.5, 2, 2, 2, 2.5, 3, 3, 3, 2.5, 2, 2, 2, 1.5, 1, 1, 1, 0.5, 0 volts within a measurement interval from 0 seconds to 12 seconds. Similarly, in the above example, the authentic security device 60 will be able to generate an actual response corresponding to the converted signal 105 shown in FIG. 6 in response to the AC analog signal authentication challenge 95 shown in FIG. 4 where no-operation is computed on the converted digital values. The actual response is illustrated as "dots" on the graph in FIG. 6 and consists of a data set of forty-nine 16-bit digital values at or very close to 0, 0, 0, 0.5, 1, 1, 1, 1.5, 2, 2, 2, 2.5, 3, 3, 3, 2.5, 2, 2, 2, 1.5, 1, 1, 1, 0.5, 0, 0, 0, −0.5, −1, −1, −1, −1.5, −2, −2, −2, −2.5, −3, −3, −3, −2.5, −2, −2, −2, −1.5, −1, −1, −1, −0.5, 0 volts within a measurement interval from 0 seconds to 24 seconds.

The expected response of an authentic security device 60 to an analog signal authentication challenge may be predetermined by characterization and statically stored in memory or computed dynamically by firmware. Alternatively, the expected response may be generated dynamically from the response of a trusted instance of the same security device. When predetermined, one or more challenge/response pairs may be combined with other device specific information (such as a serial number of the supply item) and signed with a digital signature algorithm (such as Elliptic Curve Digital Signature Algorithm or ECDSA) and encrypted with an encryption algorithm (such as Advanced Encryption Standard or AES), and both signature and encrypted result may be stored in a non-volatile memory (NVM).

In the above example, the expected response of an authentic security device 60 to the DC analog signal authentication challenge 90 shown in FIG. 3 where no-operation is computed on the converted digital values consists of a data set of twenty-five 16-bit digital values representing 0, 0, 0, 0.5, 1, 1, 1, 1.5, 2, 2, 2, 2.5, 3, 3, 3, 2.5, 2, 2, 2, 1.5, 1, 1, 1, 0.5, 0 volts within the measurement interval from 0 seconds to 12 seconds. Similarly, in the above example, the expected response of an authentic security device 60 to the AC analog signal authentication challenge 95 shown in FIG. 4 where no-operation is computed on the converted digital values consists of a data set of forty-nine 16-bit digital values representing 0, 0, 0, 0.5, 1, 1, 1, 1.5, 2, 2, 2, 2.5, 3, 3, 3, 2.5, 2, 2, 2, 1.5, 1, 1, 1, 0.5, 0, 0, 0, −0.5, −1, −1, −1, −1.5, −2, −2, −2, −2.5, −3, −3, −3, −2.5, −2, −2, −2, −1.5, −1, −1, −1, −0.5, 0 volts within the measurement interval from 0 seconds to 24 seconds.

The actual response of an authentic security device 60 to an analog signal authentication challenge and the expected response of an authentic security device 60 may differ slightly due to part to part variation of each instance of the same security device, but a high degree of statistical correlation may be seen when the data set of the response is compared with the data set of the expected response using an authentication algorithm such as the Pearson Correlation Coefficient. For example, a predetermined threshold, such as a Pearson Correlation Coefficient of 0.8 or greater, may be used for authentication. In this example, a resulting statistical correlation value less than the threshold of 0.8 indicates a weaker strength of association between the actual response and the expected response, whereas a resulting statistical correlation value greater than or equal to the threshold of 0.8 indicates a stronger strength of association between the actual response and the expected response. If the result of the correlation between the actual response of an authentic security device and the expected response of an authentic security device passes the predetermined threshold, the authentic security device may be identified and authenticated.

Figure 7:
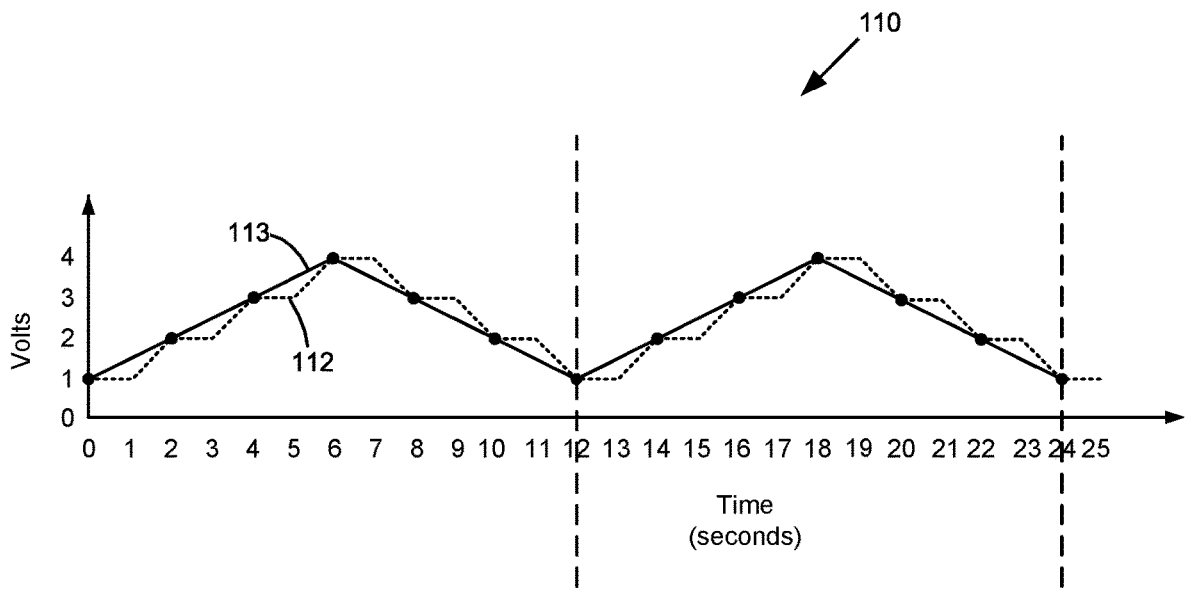
FIG. 7 shows an example converted signal by a non-authentic security device in response to the analog signal authentication challenge shown in FIG. 3.
Figure 8:
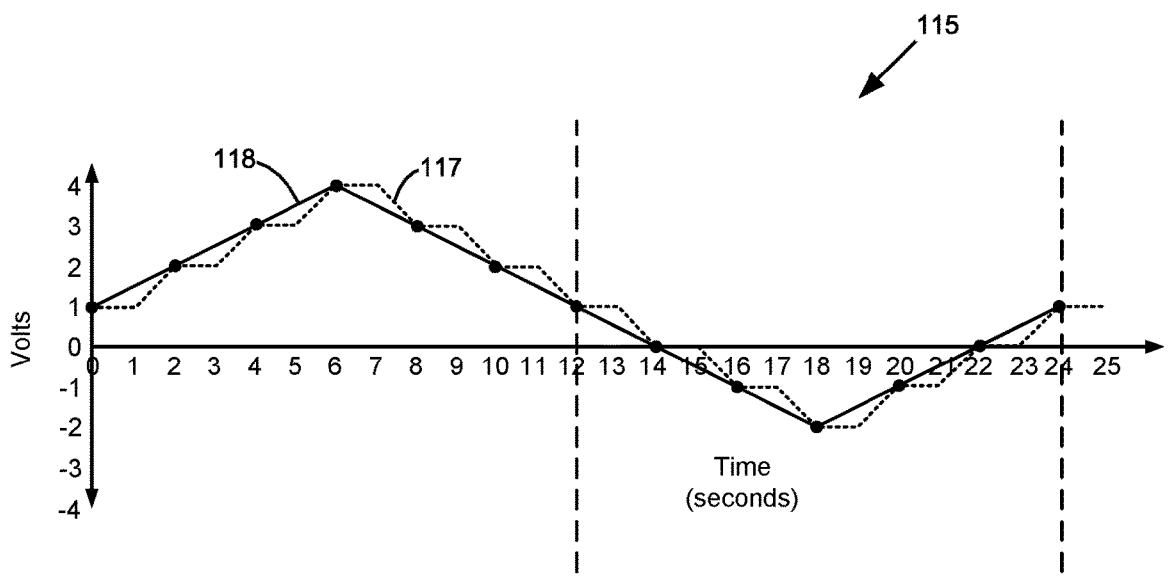
FIG. 8 shows an example converted signal by a non-authentic security device in response to the analog signal authentication challenge shown in FIG. 4.

However, a non-authentic security device is expected to have analog circuit characteristics that vary significantly from an authentic security device 60. These variances may manifest themselves in an actual response to an analog signal authentication challenge that will not be statistically correlated with the expected response of an authentic security device 60 using the same predetermined threshold, such as the Pearson Correlation Coefficient of 0.8 in the above example. For example, a non-authentic security device may contain an analog to digital converter incapable of sampling and converting analog signal authentication challenges in the same way an authentic security device 60 does, such as at a rate of one sample every one-half second and/or near zero conversion error in the above example, resulting in incorrectly converted signals. FIGS. 7 and 8 respectively show example converted signals 110, 115 from a non-authentic security device in response to authentication challenges 90 and 95, respectively, which deviate from correctly converted signals 100, 105 shown in FIGS. 5 and 6, respectively. In these examples, the analog to digital converter in the non-authentic security device has an inadequate sample frequency and conversion rate of one sample every two seconds and an inadequate conversion error of one volt offset error and, as a result, is unable to convert the analog signal with the required accuracy.

In this example, a non-authentic security device with inadequate analog circuit capabilities may generate response 110 shown in FIG. 7 to the DC analog signal authentication challenge 90 shown in FIG. 3 where no-operation is computed on the converted digital values. The response 110 is illustrated as "dots" (sampled from an incorrectly converted signal 112) on the graph in FIG. 7 and may consist of a data set of seven 16-bit digital values close to 1, 2, 3, 4, 3, 2, 1 volts within the measurement interval from 0 seconds to 12 seconds. Similarly, in this example, a non-authentic security device with inadequate analog circuit capabilities may generate response 115 shown in FIG. 8 to the AC analog signal authentication challenge 95 shown in FIG. 4 where no-operation is computed on the converted digital values. The response 115 is illustrated as "dots" (sampled from an incorrectly converted signal 117) on the graph in FIG. 8 and may consist of a data set of thirteen 16-bit digital values close to 1, 2, 3, 4, 3, 2, 1, 0, −1, −2, −1, 0, 1 volts within the measurement interval from 0 seconds to 24 seconds. It may be seen by observation of FIGS. 7 and 8 that even using interpolation between consecutive discrete samples, the converted waveforms 113, 118 produced by a non-authentic device is a triangle wave with one volt offset error instead of a multi-amplitude ramp wave with zero volt offset error produced by an authentic security device.

As a result, a non-authentic security device will not be able to convert the analog signal authentication challenge into a one or more digital values and/or be able to compute the correct arithmetical or logical operation on the converted digital values to generate a response with sufficient accuracy to produce a high degree of statistical correlation when the data set of the actual response is compared with the data set of the expected response using an authentication algorithm, such as the Pearson Correlation Coefficient. In this case, the result of the correlation between the actual response of a non-authentic security device and the expected response of an authentic security device 60 will not pass a predetermined threshold, such as the Pearson Correlation Coefficient of 0.8 or greater discussed above, used for authentication and the non-authentic security device may be identified as counterfeit and not be authenticated.

Various embodiments of the methods will now be described, but the examples provided herein should not be viewed as exhaustive as there are many embodiments that may be used to authenticate security devices using analog circuit technology disclosed herein and all combinations of these elements are considered embodiments herein. For example, the analog circuits used to generate an analog signal challenge and generate the response may be integrated in the SoC 70, or they may consist of one or more discrete components placed on a printed circuit board in imaging device 15 or supply item 55 that may be electrically connected in one or more ways. These components may also have one or more unique specifications such as analog voltage range, conversion rate, and digital resolution.

Additionally, many different authentication algorithms (such as Pearson Correlation Coefficient) and predetermined thresholds may be used to authenticate security devices and these authentication algorithms may be performed by firmware executing on a security device or an SoC. Further, the authentication of security devices disclosed herein may use one-way authentication protocol, mutual-authentication protocol, or self-authentication protocol in any of the following ways.

- A security device on a controller may authenticate a security device on a supply item (one-way authentication).
- A security device on a supply item may authenticate a security device on a controller (one-way authentication).
- A security device on a controller and a security device on a supply item may authenticate each other (mutual authentication).
- A security device on a first supply item may authenticate another security device on a second supply item (one-way authentication).
- A security device on a first supply item and another security device on a second supply item may authenticate each other (mutual authentication).
- A security device on a controller may authenticate itself (self-authentication).
- A security device on a supply item may authenticate itself (self-authentication).

Figure 9:
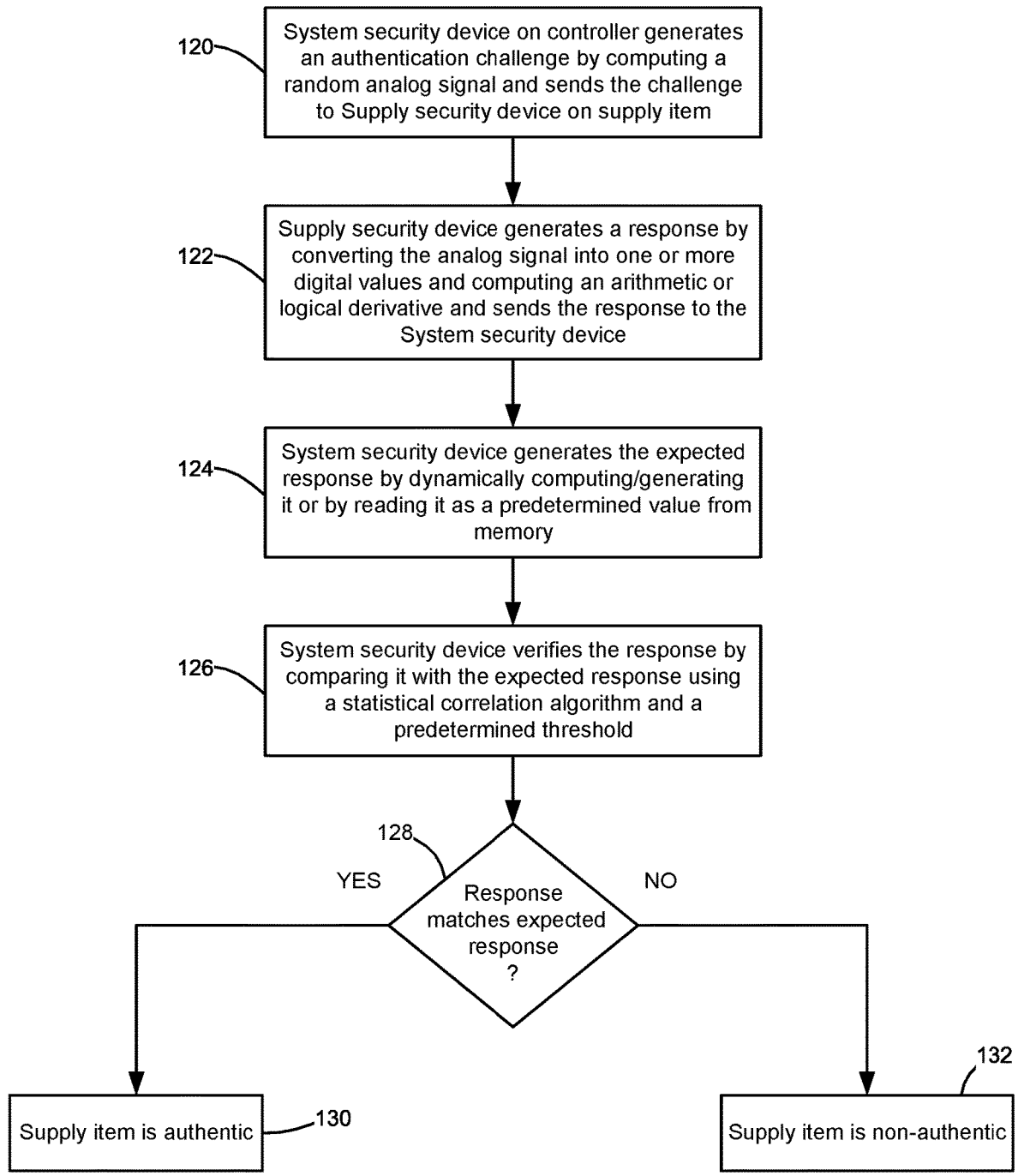
FIG. 9 is a flowchart illustrating a method of one-way authentication where a security device on the controller authenticates a security device on a supply item, according to one example embodiment.

FIG. 9 illustrates an example method of one-way authentication where a security device 60 on controller 40 authenticates a security device 60 on a supply item 55. Hereinafter, the security device placed on controller 40 may be referred to as system security device 60 and the security device placed on a supply item 55 may be referred to as supply security device 60. At block 120, system security device 60 on controller 40 generates an authentication challenge by computing a random analog signal and sends the (analog signal) challenge to supply security device 60 on supply item 55. The random analog signal generated as an authentication challenge may be random in amplitude (voltage), frequency, and/or duration. For example, the authentication challenge may be generated by generating one or more random numbers with a predetermined size and using the generated one or more random numbers as one or more indexes into a table of parameters stored in memory, where each entry in the table contains one or more parameters. The one or more parameters may then be used to configure an analog circuit, such as a digital-to-analog converter, a general-purpose-output, and a voltage level translator (discussed in greater detail in the examples below), to generate a random analog signal that varies in amplitude, frequency, and duration based on the one or more parameters. The digital-to-analog converter, general-purpose-output or voltage level translator may be circuits including one or more discrete components or a unit integrated into a component.

At block 122, supply security device 60 generates an actual response upon receiving the analog signal challenge from system security device 60 and sends the actual response to system security device 60. Supply security device 60 may generate the actual response by converting the analog signal challenge into one or more digital values during a measurement interval, wherein the measurement interval begins with a programmable start condition and ends after a programmable duration. Supply security device 60 may be configured to compute an arithmetic or logical derivative of the one or more digital values, and capture the computed derivative of the digital values as the actual response. For example, the actual response may be generated by using one or more parameters stored in memory to configure an analog circuit, such as analog-to-digital converter, a general-purpose-input, and a voltage level translator (discussed in greater detail in the examples below), to convert the analog signal challenge into one or more digital values during a measurement interval, where the measurement interval is determined by one or more parameters stored in NVM, and to capture a derivative of the digital values as the response. The derivative may be any arithmetical or logical transformation of the converted digital values, where the number, frequency, resolution, and truncation of the digital values of the response are determined by one or more parameters stored in memory. The analog-to-digital converter, general-purpose-input (GPI), and voltage level translator may be circuits including one or more discrete components or a unit integrated into a component. Each security device may generate the same or a different response to the same challenge based on configuration parameters stored in memory.

At block 124, system security device 60 generates an expected response by dynamically computing or generating the expected response and/or by reading the expected response as a predetermined value from memory. For example, the expected response may be generated by reading from a predetermined finite number of expected responses statically stored in non-volatile memory on the controller 40 or on the security device 60. Alternatively, the expected responses may be stored in a cloud database indexed by a finite size hash of device specific information and accessed by the controller 40 through a secure network connection. In another example, where a security device on the controller 40 and a security device on the supply item 55 are instances of the same security device, the expected response of a first security device to an authentication challenge may be dynamically generated by generating the same response of a second security device using the same analog signal challenge and the same response computation as was used for the first security device. As an example, SoC 70 may command system security device 60a and supply security device 60b to each generate an analog response to an authentication challenge with the same parameters. SoC 70 may then measure each of the responses from the system security device 60a and supply security device 60b and compare them. If system security device 60a is considered as the reference, the response from system security device 60a is set as the expected response and the response from supply security device 60b must match the response from system security device 60a within margins for supply security device 60b to be considered authentic.

At block 126, system security device 60 verifies the actual response received from supply security device 60 by comparing the actual response with the expected response using a statistical correlation algorithm and a predetermined threshold. For example, the actual response and the expected response may be compared using Pearson correlation coefficients. With a Pearson correlation coefficient of 0.8 used as a predetermined threshold, for example, a correlation computation between the actual response and the expected response that results in a Pearson correlation coefficient below 0.8 may indicate a relatively weak relationship between the actual response and the expected response. On the other hand, a correlation computation between the actual response and the expected response that results in a Pearson correlation coefficient equal to or greater than 0.8 may indicate a relatively strong relationship between the actual response and the expected response.

At block 128, a determination is made whether the actual response of supply security device 60 matches the expected response. For instance, in the above example, it may be determined that the actual response does not match the expected response if the resulting Pearson correlation coefficient of the correlation computation is less than the predetermined threshold of 0.8. Otherwise, if the correlation computation results in a Pearson correlation coefficient that is greater than or equal to the predetermined threshold of 0.8, it may be determined that the actual response of the supply security device matches the expected response.

When it is determined at block 128 that the actual response matches the expected response, an indication may be made that supply security device 60 (and, consequently, supply item 55) is authentic at block 130. Otherwise, when it is determined at block 128 that the actual response does not match the expected response, an indication may be made that supply security device 60 (and, consequently, supply item 55) is non-authentic at block 132. One or more enforcement actions may be performed to protect against the use of the non-authentic supply item and/or prevent damage to imaging device 15. For example, the enforcement action may include preventing use of the non-authentic supply item in imaging device 15 and/or notifying the user that a non-authentic/unsupported supply item is installed.

Figure 10:
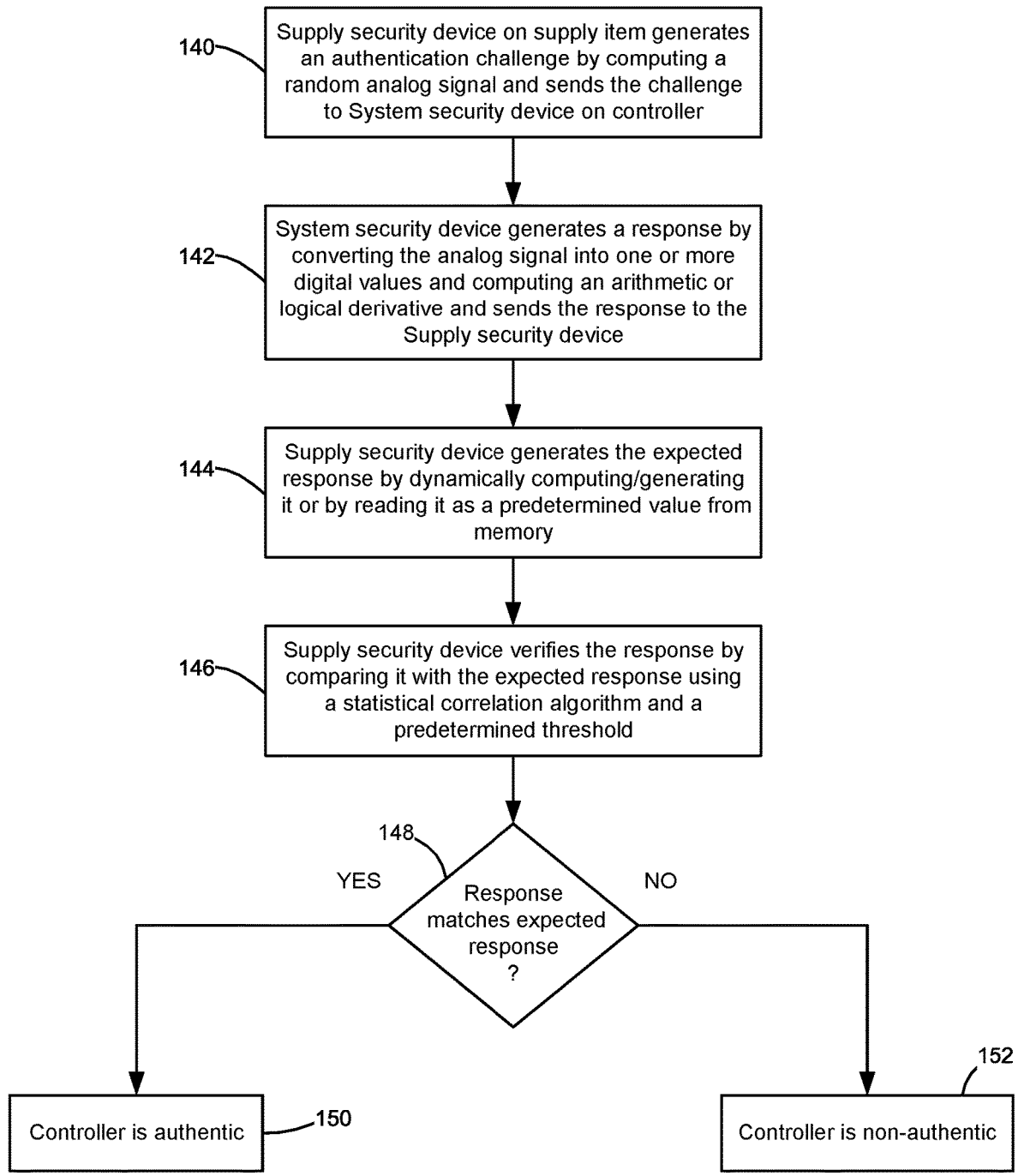
FIG. 10 is a flowchart illustrating a method of one-way authentication where a security device on a supply item authenticates a security device on the controller, according to one example embodiment.

FIG. 10 illustrates an example method of one-way authentication where a supply security device 60 on supply item 55 authenticates system security device 60 on controller 40. It is noted that the same techniques and operations described above with respect to FIG. 9 may be used in this example when applicable. At block 140, supply security device 60 on supply item 55 generates an authentication challenge by computing a random analog signal and sends the challenge to system security device 60 on controller 40. Upon receiving the challenge from supply security device 60, system security device 60 generates an actual response by converting the analog signal into one or more digital values and computing an arithmetic or logical derivative, and sends the actual response to supply security device 60 at block 142. At block 144, supply security device 60 generates an expected response by dynamically computing or generating the expected response, and/or by reading the expected response as a predetermined value from memory in the same manner as discussed above with respect to FIG. 9. In another example, for instances where security devices 60 are instances of the same security device, a second security device may be used to generate an analog response to the same authentication challenge with the same parameters and such analog response may be used as the expected response of the first security device. At block 146, supply security device 60 verifies the actual response received from system security device 60 by comparing the actual response with the expected response using a statistical correlation algorithm and a predetermined threshold. At block 148, a determination is made whether the actual response of system security device 60 matches the expected response. When it is determined at block 148 that the actual response matches the expected response, an indication may be made that system security device 60 (and, consequently, controller 40) is authentic at block 150. Otherwise, when it is determined at block 148 that the actual response does not match the expected response, an indication may be made that system security device 60 (and, consequently, controller 40) is non-authentic at block 152. One or more enforcement actions may be performed to protect against the use of the non-authentic controller.

In the example shown in FIG. 10, one-way authentication is performed for instances where a supply security device 60 on supply item 55 authenticates system security device 60 on controller 40. In other embodiments, a supply security device 60 on supply item 55 may authenticate a supply security device 60 on another supply item 55 (instead of system security device 60 on controller 40) by applying the same method discussed above with respect to FIG. 10. In particular, the supply security device 60 on a first supply item 55 may generate an authentication challenge and send the authentication challenge to another supply security device 60 on a second supply item 55. In turn, the supply security device 60 on the second supply item 55 may generate a response and send the response to the security device 60 on the first supply item 55. Verification of the response may then be performed using the same techniques and operations discussed above.

Figure 11:
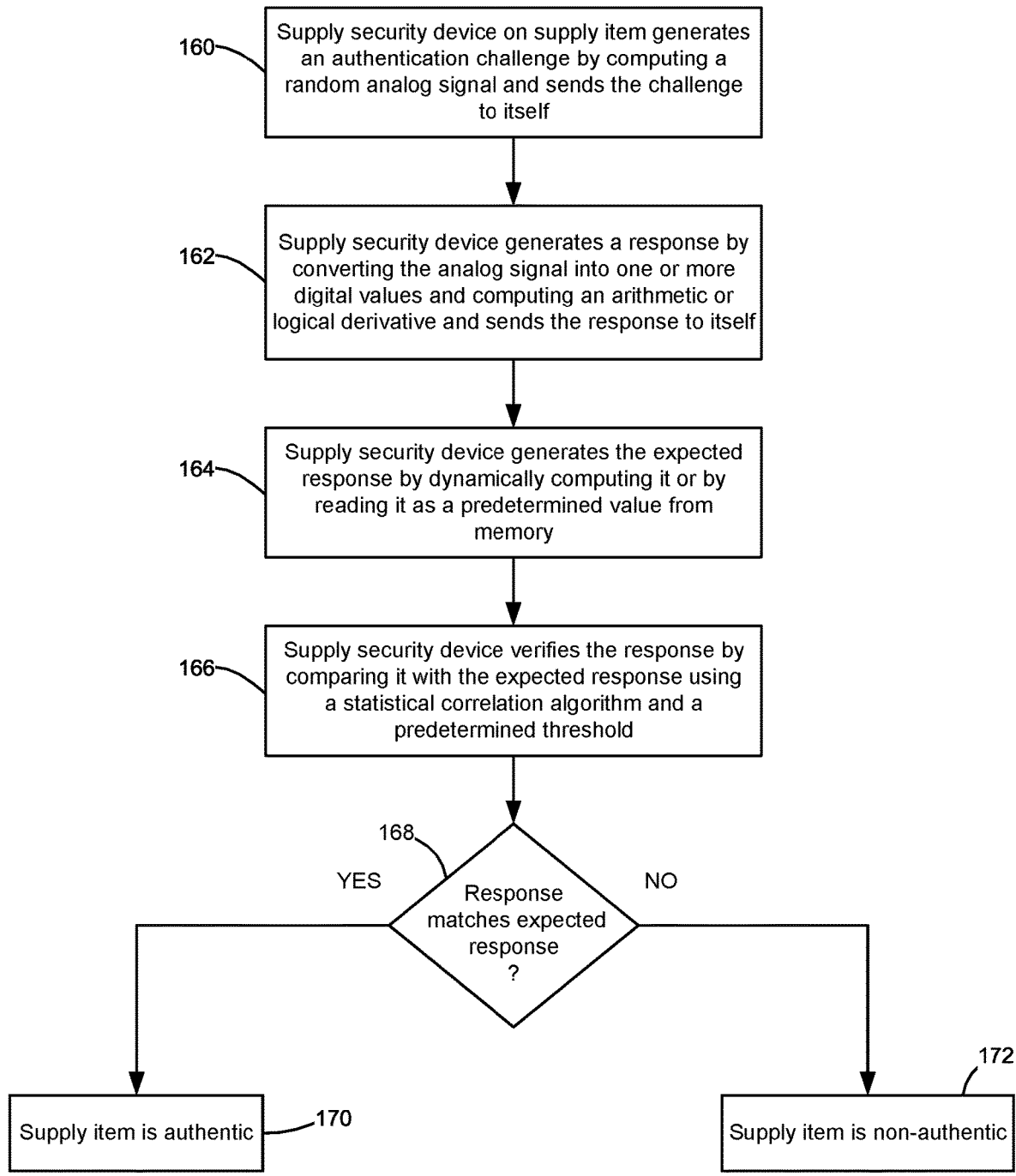
FIG. 11 is a flowchart illustrating a method of self-authentication where a security device on a supply item authenticates itself, according to one example embodiment.

FIG. 11 illustrates an example method of self-authentication where a supply security device 60 on supply item 55 authenticates itself. It is noted that the same techniques and operations described above with respect to FIG. 9 may be used in this example when applicable. At block 160, supply security device 60 generates an authentication challenge by computing a random analog signal and sends the challenge to itself. At block 162, supply security device 60 generates an actual response by converting the analog signal into one or more digital values and computing an arithmetic or logical derivative, and sends the actual response to itself. At block 164, supply security device 60 generates an expected response by dynamically computing or generating the expected response and/or by reading the expected response as a predetermined value from memory. At block 166, supply security device 60 verifies the actual response by comparing the actual response with the expected response using a statistical correlation algorithm and a predetermined threshold. At block 168, a determination is made whether the actual response matches the expected response. When it is determined at block 168 that the actual response matches the expected response, an indication may be made that supply security device 60 (and, consequently, supply item 55) is authentic at block 170. Otherwise, when it is determined at block 168 that the actual response does not match the expected response, an indication may be made that supply security device 60 (and, consequently, supply item 55) is non-authentic at block 172. One or more enforcement actions may be performed to protect against the use of the non-authentic supply item. The same method may be applied by system security device 60 on controller 40 for authenticating itself.

Analog authentication schemes have been described above that may be used to authenticate security devices 60. Presented below, with reference to FIGS. 12-18, are specific examples and methodologies executed on security devices 60 that may be used for analog authentication, such as between security devices 60 in imaging device 15 and supply items 55. In the examples shown, instances of the same security device are placed on controller 40 and on each supply item 55. The security devices are generally designated as security devices 60, but the security device placed on controller 40 has been designated as system security device 60a and each security device placed on each supply item 55 has been designated as supply security device 60b for ease of description. Each security device 60 may include an I2C master serial interface (I2CM) unit 265 and an I2C slave serial interface (I2CS) unit 260, a microcontroller (MCU) unit 240, an encryption (ENC) unit 250 and a decryption (DEC) unit 255, a non-volatile memory (NVM) 245, a general-purpose-input (GPI) unit 280, a general-purpose-output (GPO) unit 285, an analog-to-digital converter (ADC) unit 270 and a digital-to-analog-converter (DAC) unit 275. SoC 70 in controller 40 may include a central processing unit (CPU) 200, an NVM 205, an I2CM unit 210, an I2CS unit 215, an ADC unit 220, a DAC unit 225, a GPI unit 230, and a GPO unit 235. In the embodiment illustrated, SoC 70 directly communicates with system security device 60a while communication between SoC 70 and supply security devices 60b go through system security device 60a. In other embodiments, SoC 70 may directly communicate with all security devices 60 including system security device 60a and supply security devices 60b, such as via a shared bus.

DAC-ADC Serial (Authentication Challenge Sent Over DAC-ADC Interface, Response Sent Over Serial Interface)

Figure 12:
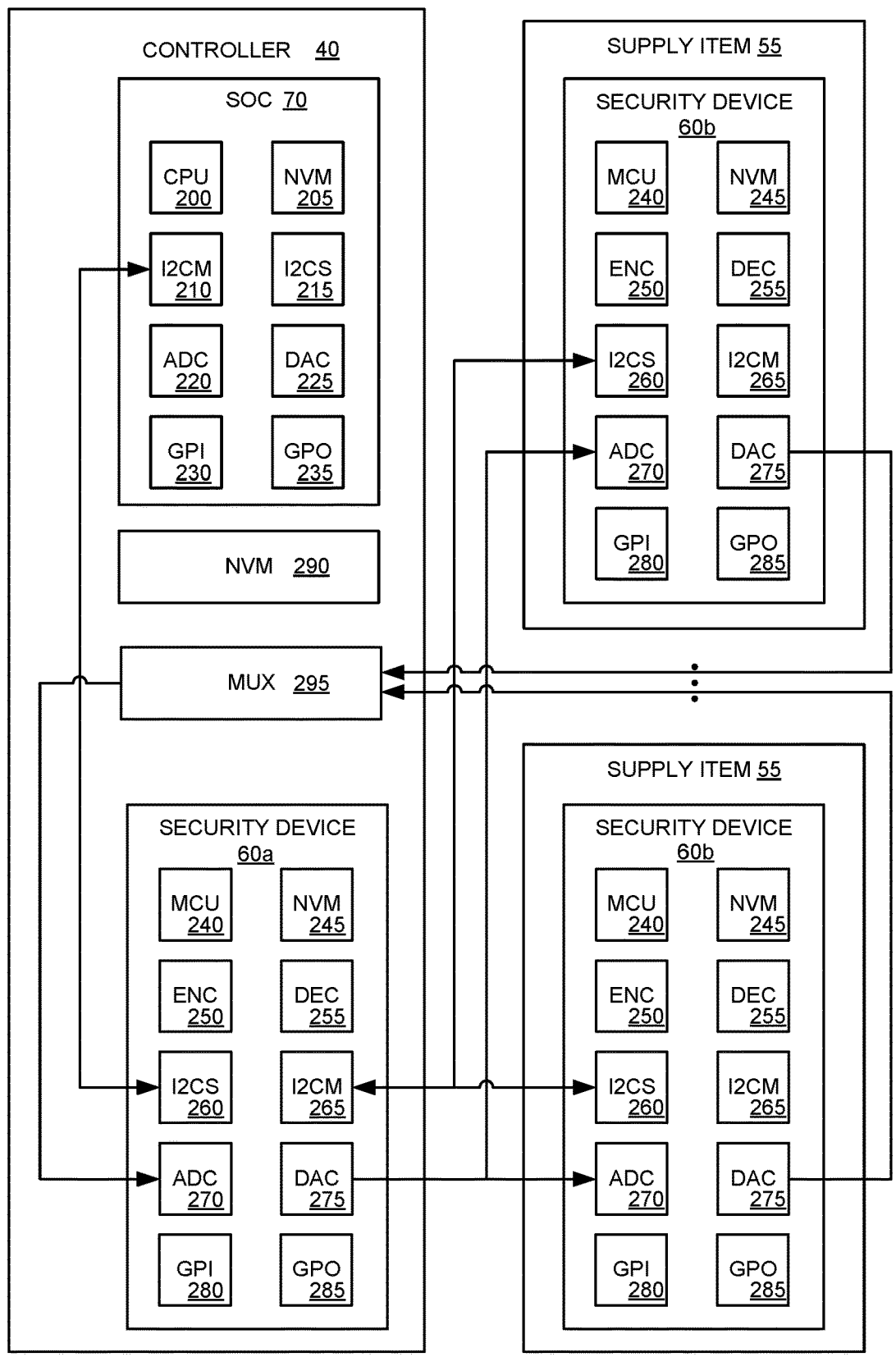
FIG. 12 is a block diagram of an example embodiment where an authentication challenge is sent from a first security device to a second security device over a DAC-ADC interface and a response sent from the second security device to the first security device over a serial interface.

In the embodiment shown in FIG. 12, I2CM unit 210 of SoC 70 is connected to the I2CS unit 260 of system security device 60a and the I2CM unit 265 of system security device 60a is connected to the I2CS unit 260 of each supply security device 60b. In addition, the output of DAC unit 275 of system security device 60a is connected to the input of ADC unit 270 of each supply security device 60b, and the output of DAC unit 275 of each supply security device 60b is connected to the input of ADC unit 270 of system security device 60a, either directly or through a multiplexor (MUX) 295. In this embodiment, the authentication of supply security devices 60b on supply items 55 uses both digital and analog authentication methods described in some detail below.

Digital authentication consists of the host SoC 70 commanding, for example, the system security device 60a to generate a random cryptographic challenge and to send the challenge to a supply security device 60b. The supply security device 60b receives the challenge and generates a response using a cryptographic algorithm and shared secret key, known only to the system and supply security devices 60. The supply security device 60b returns the response to the system security device 60a that verifies the response by using a cryptographic algorithm and shared secret key, to determine the authenticity of each supply security device 60b on supply item 55. The system security device 60a then communicates the verification result to the SoC 70 for further action. Since the challenge, response, and result are computed and communicated digitally over the serial interface, this type of digital authentication produces a completely deterministic result (i.e., execution will always produce the same result under the same circumstances and/or inputs).

Analog authentication consists of the host SoC 70 commanding, for example, the system security device 60a to generate an authentication challenge consisting of an analog signal that may vary in amplitude, frequency, and/or duration. Firmware on the system security device 60a generates the authentication challenge using parameters stored in its NVM 245 to configure and control its DAC unit 275 to output an analog signal that is connected to the input of the ADC unit 270 of the supply security device 60b. Firmware on the supply security device 60b generates a response using parameters stored in its NVM 245 to define a measurement interval. The ADC unit 270 of the supply security device 60b is configured to convert the analog signal at its input into one or more digital values during the measurement interval. A derivative of the digital values is captured as the response. As before, the derivative may be any arithmetical operation or logical transformation performed on the converted digital values which may be based on one or more parameters and/or instructions stored in memory. The response is sent from the supply security device 60b to the system security device 60a over the serial interface.

The system security device 60a verifies the response from the supply security device 60b (or sends the response to the SoC 70 to verify) by comparing it to an expected response (that is dynamically computed or predetermined and statically stored in memory) using a statistical algorithm and predetermined threshold to determine the authenticity of the supply security device 60b on supply item 55. The system security device 60a then communicates the verification result to the SoC 70 for further action. Since the challenge is an analog signal and the response is a digitized value with finite quantization error, this type of analog authentication produces a statistical result and uses a predetermined threshold for verification.

For both the digital and analog challenge/response authentication, the digital communication between the master and slave devices over the serial interfaces may be encrypted and authenticated with cryptographic protocols using one-way authentication (SoC 70 authenticates system security device 60a and system security device 60a authenticates supply security device 60b) or mutual authentication (SoC 70 and system security device 60a authenticate each other, and system security device 60a and supply security device 60b authenticate each other).

The analog challenge/response authentication between the security devices 60 over the analog interfaces (DAC-to-ADC and ADC-to-DAC) may be one-way authentication (system security device 60a authenticates supply security device 60b), mutual authentication (system security device 60a and supply security device 60b authenticate each other), or self-authentication (system security device 60a authenticates itself and supply security device 60b authenticates itself).

Additional embodiments are described below, but these additional embodiments should not be viewed as exhaustive. It should also be understood that all previous descriptions may apply in whole or in part to these additional embodiments.

DAC-ADC Wrap (Authentication Challenge Sent Over DAC-ADC Interface, Response Sent Over DAC-ADC Interface)

Figure 13:
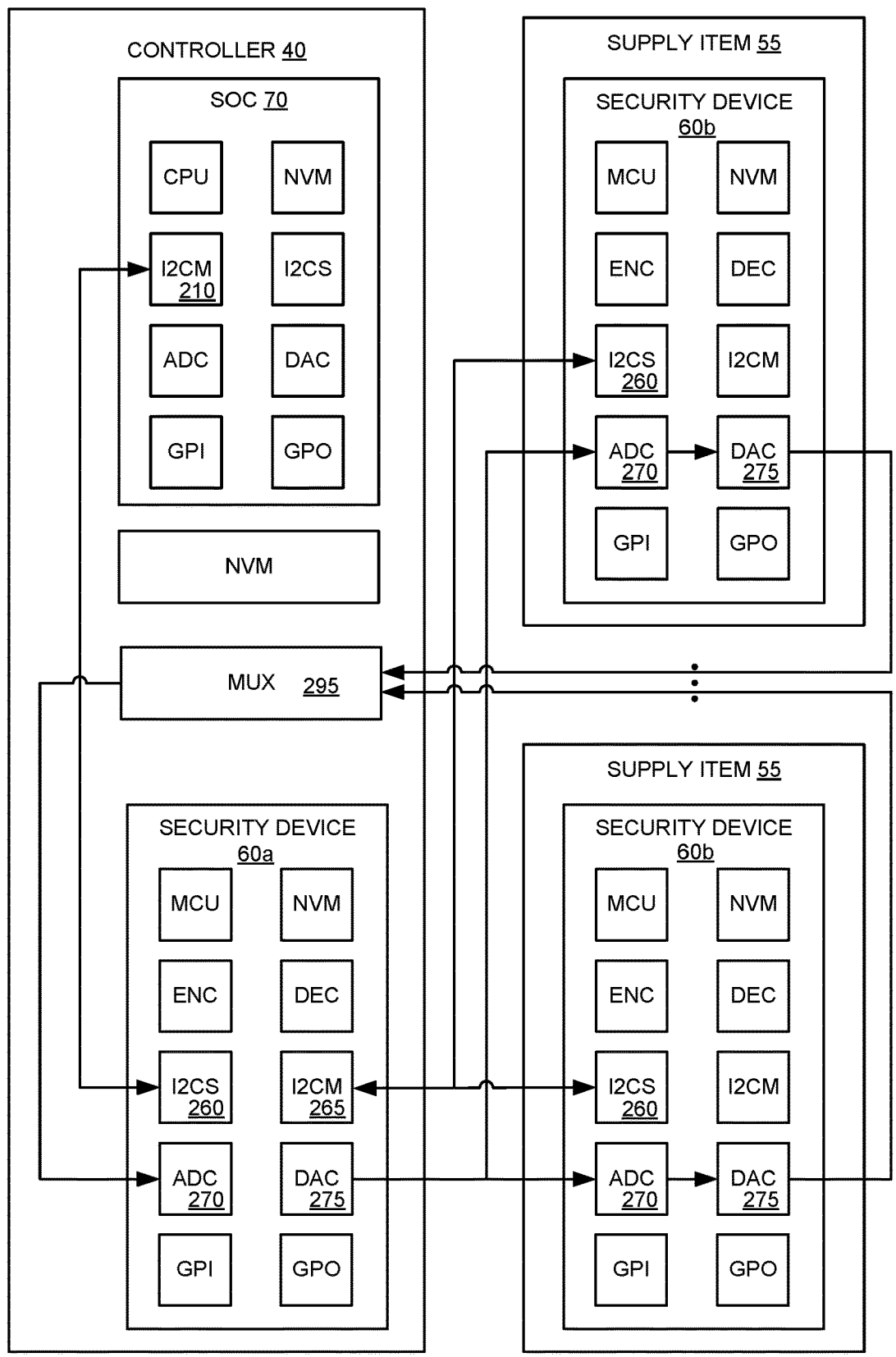
FIG. 13 is a block diagram of an example embodiment where an authentication challenge is sent from a first security device to a second security device over a DAC-ADC interface and a response sent from the second security device to the first security device over a DAC-ADC interface.

In the embodiment shown in FIG. 13, all components are placed and connected as described for the embodiment shown in FIG. 12, but analog authentication differs as follows. Instead of a digital response being sent from the supply security device 60b to the system security device 60a over the serial interface, an analog response is sent over the connection between the output of the DAC unit 275 of the supply security device 60b and the input of the ADC unit 270 of the system security device 60a. This results in an analog signal loop where the challenge is sent from the output of the DAC unit 275 of the system security device 60a to the input of the ADC unit 270 of the supply security device 60b, and the response is sent from the output of the DAC unit 275 of the supply security device 60b to the input of the ADC unit 270 of the system security device 60a.

Analog authentication consists of the host SoC 70 commanding, for example, the system security device 60a to generate an authentication challenge consisting of an analog signal that may vary in amplitude, frequency, and/or duration. Firmware on the system security device 60a generates the authentication challenge using parameters stored in the NVM to configure and control the DAC unit 275 to output a first analog signal that is connected to the input of the ADC unit 270 of the supply security device 60b. Firmware on the supply security device 60b generates a first response using parameters stored in the NVM to define a first measurement interval and to configure the ADC unit 270 to convert the first analog signal into one or more digital values during the first measurement interval. A derivative of the digital values is captured as the first response.

Firmware on the supply security device 60b generates a second analog signal using the first response and parameters stored in the NVM to configure and control the DAC unit 275 to output the second analog signal that is connected to the input of the ADC unit 270 of the system security device 60a. The firmware on the system security device 60a generates a second response using parameters stored in the NVM to define a second measurement interval and to configure the ADC unit 270 to convert the second analog signal into one or more digital values during the second measurement interval. A derivative of the digital values is captured as the second response.

The second response is verified by the system security device 60a (or sent to the SoC 70 to verify) as previously described, and the result is communicated over the serial interface to the SoC 70 for further action.

Internal Wrapback Self-Authentication (Authentication Challenge Sent Over Internal DAC-ADC Interface for Self-Authentication, Result Sent Over Serial Interface)

Figure 14:
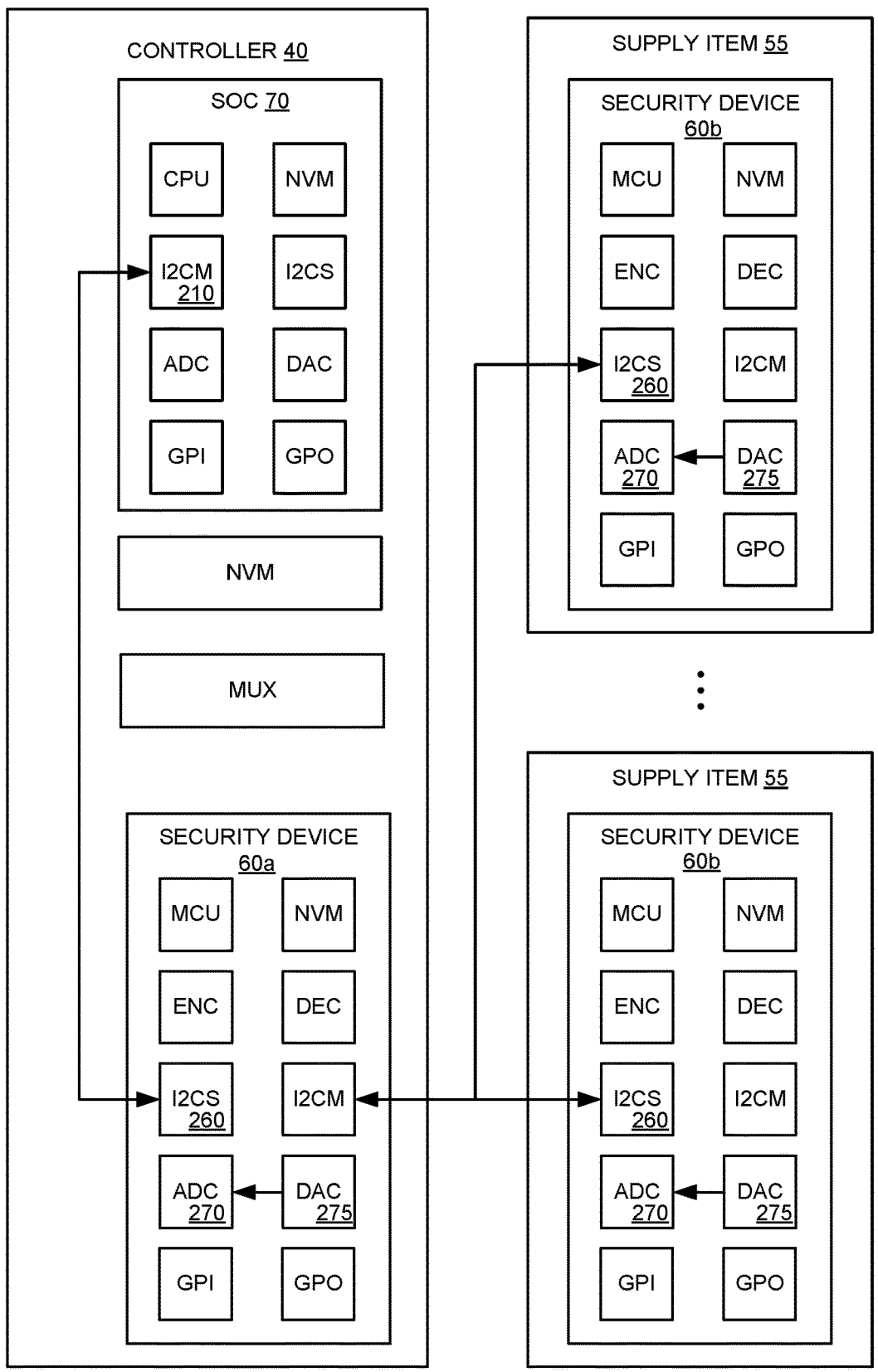
FIG. 14 is a block diagram of an example embodiment where an authentication challenge is sent over an internal DAC-ADC interface of a first security device for self-authentication and a result of the self-authentication is sent from the first security device to a second security device over the serial interface.

In the embodiment shown in FIG. 14, all components are placed and connected as described for the embodiment shown in FIG. 13, but analog authentication differs as follows. Instead of the analog signal being generated and sent by one security device to another security device over the external analog connection (DAC-to-ADC), the analog signal is generated and sent by a security device to itself over an internal analog connection (DAC-to-ADC). This enables a security device to self-authenticate itself and communicate the result over the serial interface.

Analog authentication begins with the host SoC 70 commanding, for example, the system security device 60a to self-authenticate itself and to command a supply security device 60b to self-authenticate itself. The supply security device 60b internally connects the output of its DAC unit 275 to the input of its ADC unit 270 and disconnects them from their external connections. The supply security device 60b then generates a random challenge, generates a response, and verifies the response as previously described to self-determine its authenticity. The supply security device 60b communicates the result of the of the self-authentication to the system security device 60a over the serial interface and the system security device 60a communicates the results of the self-authentication over the serial interface to the SoC 70 for further action.

GPO-ADC Serial (Authentication Challenge Sent Over GPO-ADC Interface, Response Sent Over Serial Interface)

Figure 15:
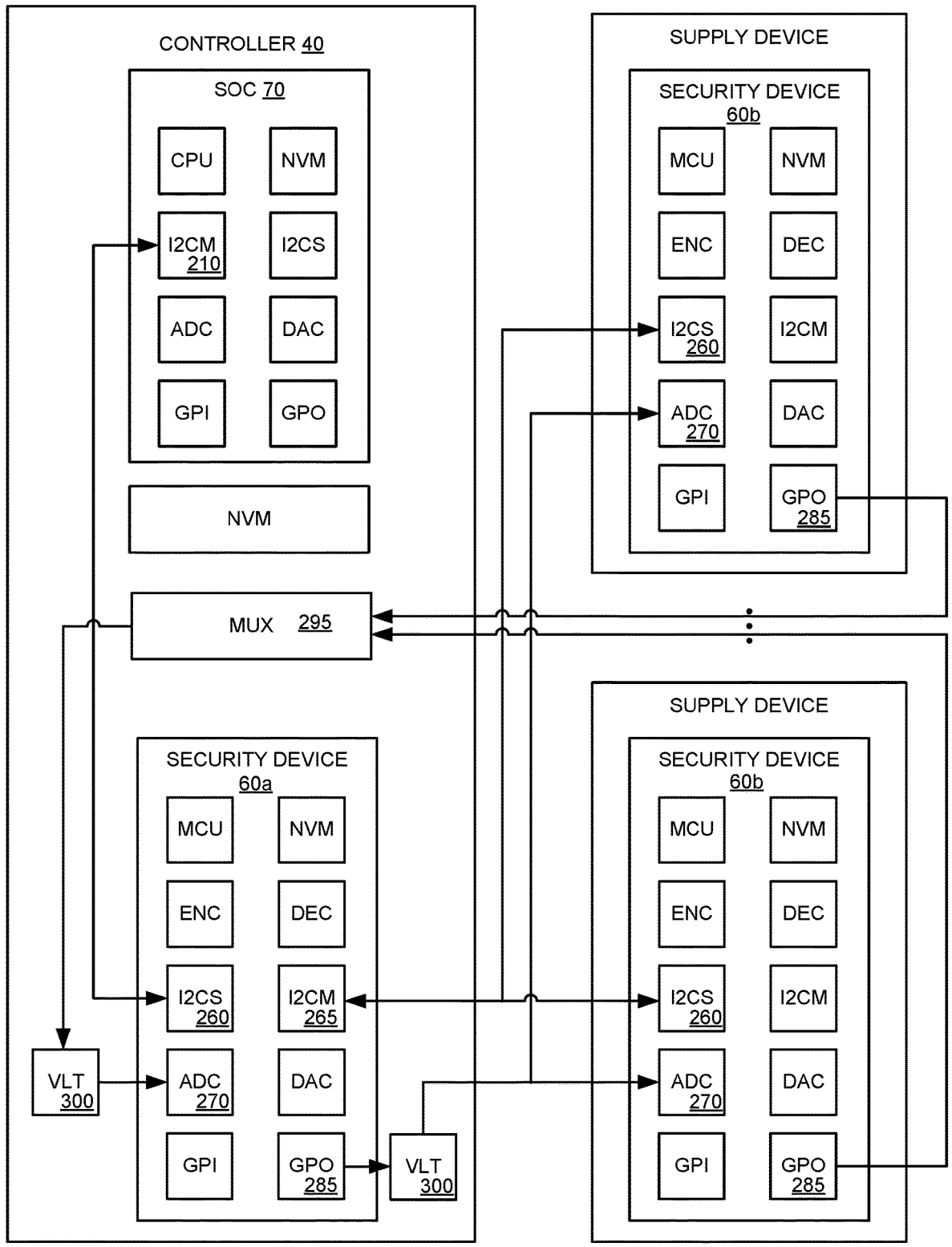
FIG. 15 is a block diagram of an example embodiment where an authentication challenge is sent from a first security device to a second security device over a GPO-ADC interface and a response is sent from the second security device to the first security device over the serial interface.

In the embodiment shown in FIG. 15, all components are placed as described for the embodiment shown in FIG. 12, but analog authentication differs as follows. Instead of an analog signal being generated at the output of the DAC unit 275 of a security device 60, the analog signal is generated at the GPO unit 285 of a security device 60 that is connected to the input of the ADC unit 270 of another security device 60 either directly or through MUX 295 and/or a programmable voltage level translator (VLT) 300. VLT 300, for example, may include a configurable resistor divider for varying the amount of output voltages in a controlled manner, and/or circuitry capable of setting different voltages based on signals from GPO 285. In this configuration, VLT 300 takes in signals from GPO 285 and converts the signals into a multi-level analog signal based on its programmed configuration. The multi-level analog signal at the output of VLT 300 is then used as the authentication challenge. VLT 300 may be implemented with an external component or any combination of external components relative to security device 60, or integrated in the security device 60 as part of GPO 285.

Analog authentication consists of the host SoC 70 commanding, for example, the system security device 60a to generate an authentication challenge consisting of an analog signal that may vary in amplitude, frequency, and/or duration. Firmware on the system security device 60a generates the authentication challenge using parameters stored in the NVM to configure the programmable VLT 300 to set the amplitude of the analog signal and to set the frequency and duration of the analog signal using a pattern generator (any combination of hardware and firmware) to control the hardware of the GPO unit 285 and VLT 300 to output the analog signal that is connected to the input of the ADC unit 270 of the supply security device 60b. Firmware on the supply security device 60b generates a response using parameters stored in the NVM to define a measurement interval and to configure the ADC unit 270 to convert the analog signal at the input of the ADC unit 270 into one or more digital values during the measurement interval. A derivative of the digital values is captured as the response. The response is sent from the supply security device 60*b* to the system security device 60*a* over the serial interface where it is verified as previously described, and the result is communicated over the serial interface to the SoC 70 for further action.

GPO-GPI Serial (Authentication Challenge Sent Over GPO-GPI Interface, Response Sent Over Serial Interface)

Figure 16:
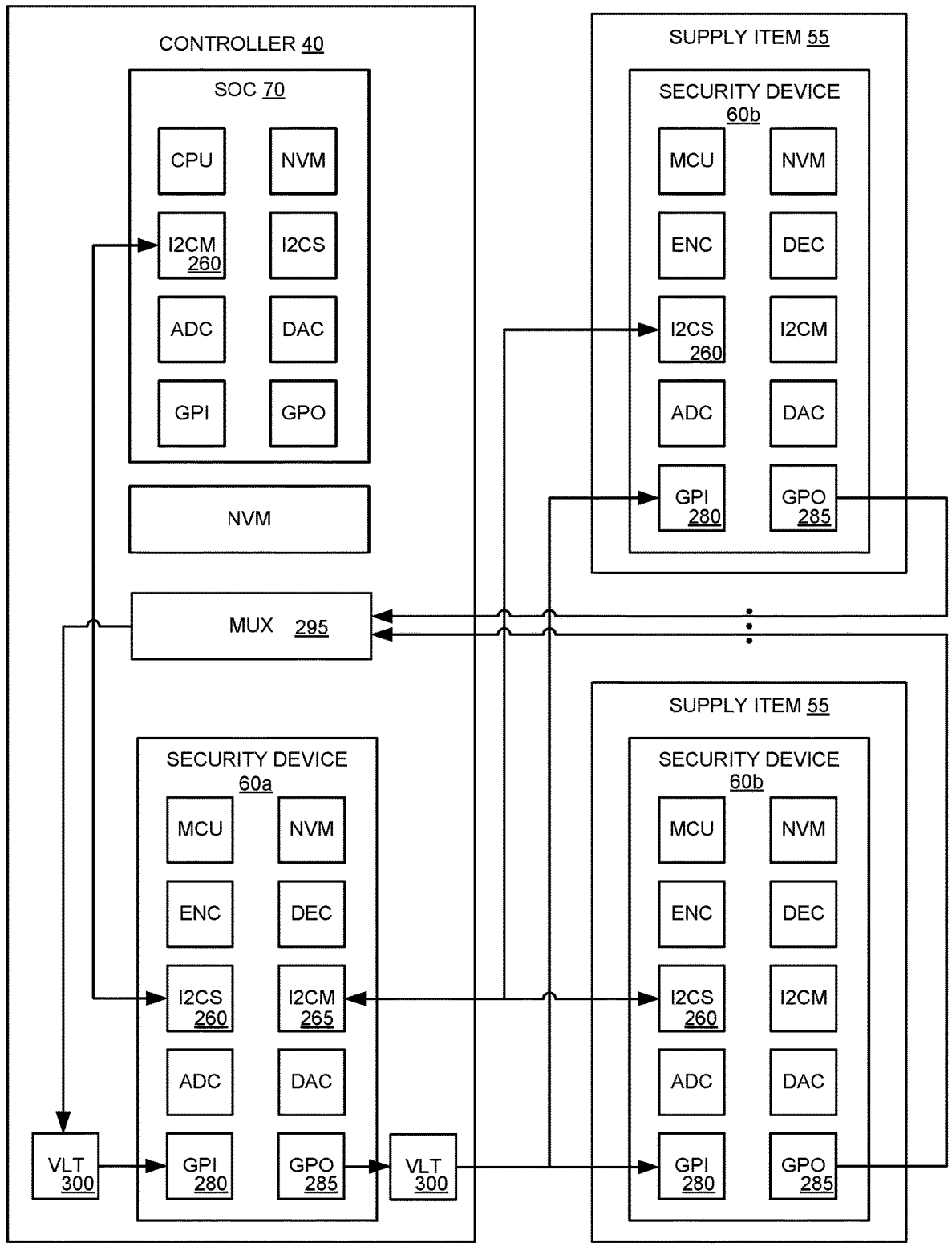
FIG. 16 is a block diagram of an example embodiment where an authentication challenge is sent from a first security device to a second security device over a GPO-GPI interface and a response is sent from the second security device to the first security device over the serial interface.

In embodiment shown in FIG. 16, all components are placed as described for the embodiment shown in FIG. 15, but analog authentication differs as follows. Instead of the generated analog signal being sent to the input of the ADC unit 270 of another security device 60, the analog signal is sent to the GPI unit 280 of another security device 60 either directly or through MUX 295 and/or programmable VLT 300. In this example, the analog authentication challenge generated by system security device 60*a* may include a random serial pattern that is serially shifted across the GPO 285 of system security device 60*a* to the GPI 280 of supply security device 60*b* using VLT 300. Supply security device 60*b* is configured to capture the serial pattern of the authentication challenge from VLT 300 and generate a response by computing an arithmetic or logic operation on the authentication challenge.

Analog authentication consists of the host SoC 70 commanding, for example, the system security device 60*a* to generate an authentication challenge consisting of an analog signal that may vary in amplitude, frequency, and/or duration. Firmware on the system security device 60*a* generates the authentication challenge using parameters stored in the NVM to configure programmable VLT 300 to set the amplitude of the analog signal and to set the frequency and duration of the analog signal using a pattern generator (any combination of hardware and firmware) to control the hardware of the GPO unit 285 and VLT 300 to output the analog signal that is connected to the GPI unit 280 of the supply security device 60*b*. Firmware on the supply security device 60*b* generates a response using parameters stored in the NVM to define a measurement interval and to configure the GPI unit 280 to convert the analog signal into one or more digital values during the measurement interval. A derivative of the digital values is captured as the response. The response is sent from the supply security device 60*b* to the system security device 60*a* over the serial interface where it is verified as previously described, and the result is communicated over the serial interface to the SoC 70 for further action.

GPO-GPI Wrap (Authentication Challenge Sent Over GPO-GPI Interface, Response Sent Over GPO-GPI Interface)

Figure 17:
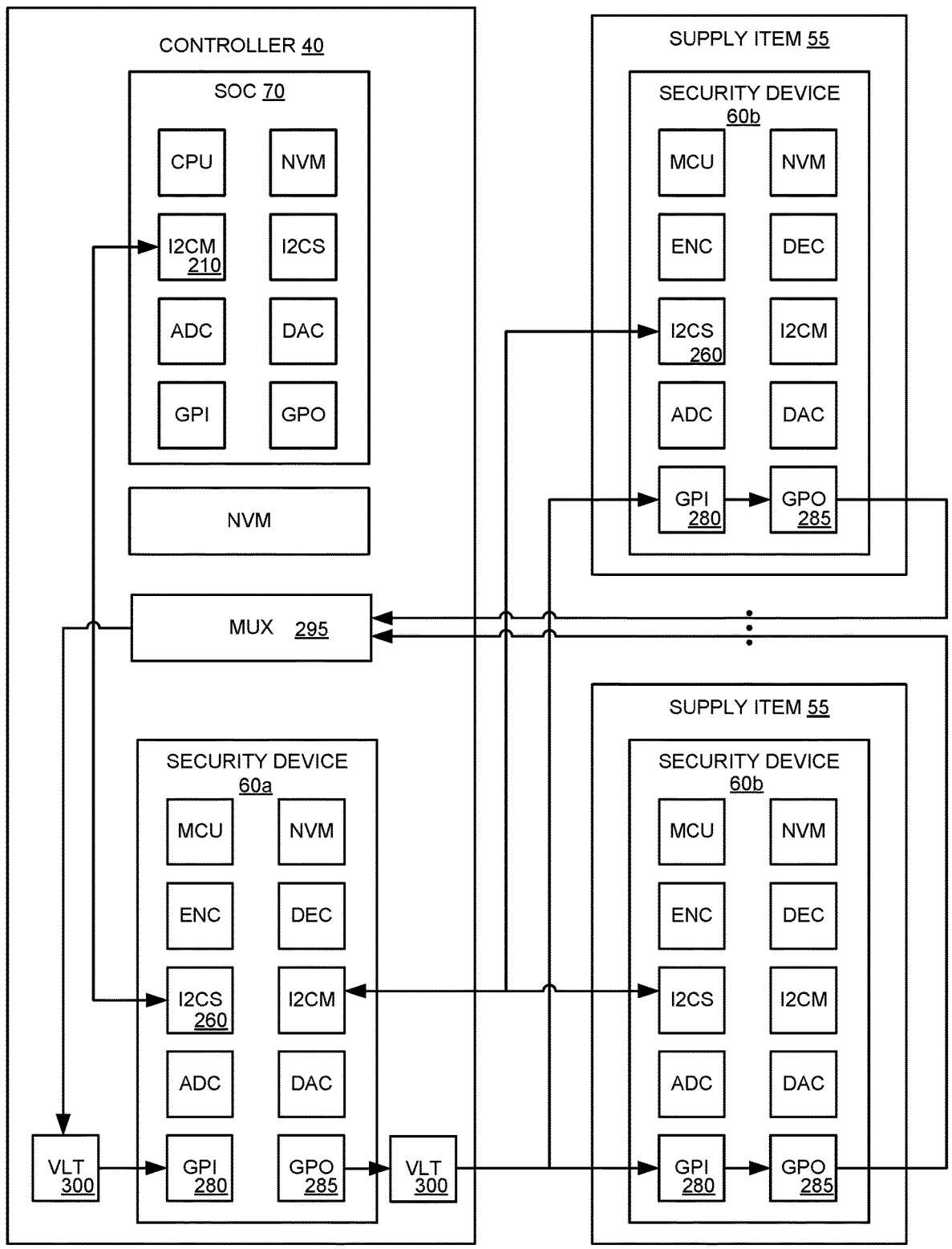
FIG. 17 is a block diagram of an example embodiment where an authentication challenge is sent from a first security device to a second security device over a GPO-GPI interface and a response is sent from the second security device to the first security device over a GPO-GPI interface.

In the embodiment shown in FIG. 17, all components are placed and connected as described for the embodiment shown in FIG. 16, but analog authentication differs as follows. Instead of a digital response being sent from the supply security device 60*b* to the system security device 60*a* over the serial interface, an analog response is sent over the connection between the GPO unit 285 of the supply security device 60*b* and the GPI unit 280 of the system security device 60*a* using VLT 300. In this configuration, the multi-level analog signal at the output of VLT 300 between GPO 285 of system security device 60*a* and GPI 280 of supply security device 60*b* is used as the analog authentication challenge, while the multi-level analog signal at the output of VLT 300 between GPO 285 of supply security device 60*b* and GPI 280 of system security device 60*a* is used as the analog response. In one example, the analog response may be serially shifted across the GPO 285 of supply security device 60*a* to the GPI 280 of system security device 60*a* using VLT 300. This results in an analog signal loop where the challenge is sent from the GPO unit 285 of the system security device 60*a* connected to the GPI unit 280 of the supply security device 60*b*, and the response is sent from the GPO unit 285 of the supply security device 60*b* connected to the GPI unit 280 of the system security device 60*a*.

Analog authentication consists of the host SoC 70 commanding, for example, the system security device 60*a* to generate an authentication challenge consisting of an analog signal that may vary in amplitude, frequency, and/or duration. Firmware on the system security device 60*a* generates the authentication challenge using parameters stored in the NVM to configure VLT 300 to set the amplitude of the analog signal and to set the frequency and duration of the analog signal using a pattern generator (any combination of hardware and firmware) to control the GPO unit 285 and VLT 300 to output a first analog signal that is connected to the GPI unit 280 of the supply security device 60*b*. Firmware on the supply security device 60*b* generates a first response using parameters stored in the NVM to define a first measurement interval and to configure the GPI unit 280 to convert the analog signal at its input into one or more digital values during the first measurement interval. A derivative of the digital values is captured as the first response.

The firmware on the supply security device 60*b* generates an analog signal using the first response and parameters stored in the NVM to configure VLT 300 to set the amplitude of the analog signal and to set the frequency and duration of the analog signal using a pattern generator (any combination of hardware and firmware) to control the GPO unit 285 and VLT 300 to output a second analog signal that is connected to the GPI unit 280 of the system security device 60*a*. The firmware on the system security device 60*a* generates a second response using parameters stored in the NVM to define a second measurement interval and to configure the GPI unit 280 to convert the second analog signal at its input into one or more digital values during the second measurement interval. A derivative of the digital values is captured as the second response.

The second response is verified by the system security device 60*a* (or sent to the SoC 70 to verify) as previously described, and the result is communicated over the serial interface to the SoC 70 for further action.

GPO-GPI Self-Authentication (Authentication Challenge Sent Over Internal GPO-GPI Interface, Result Sent Over Serial Interface)

Figure 18:
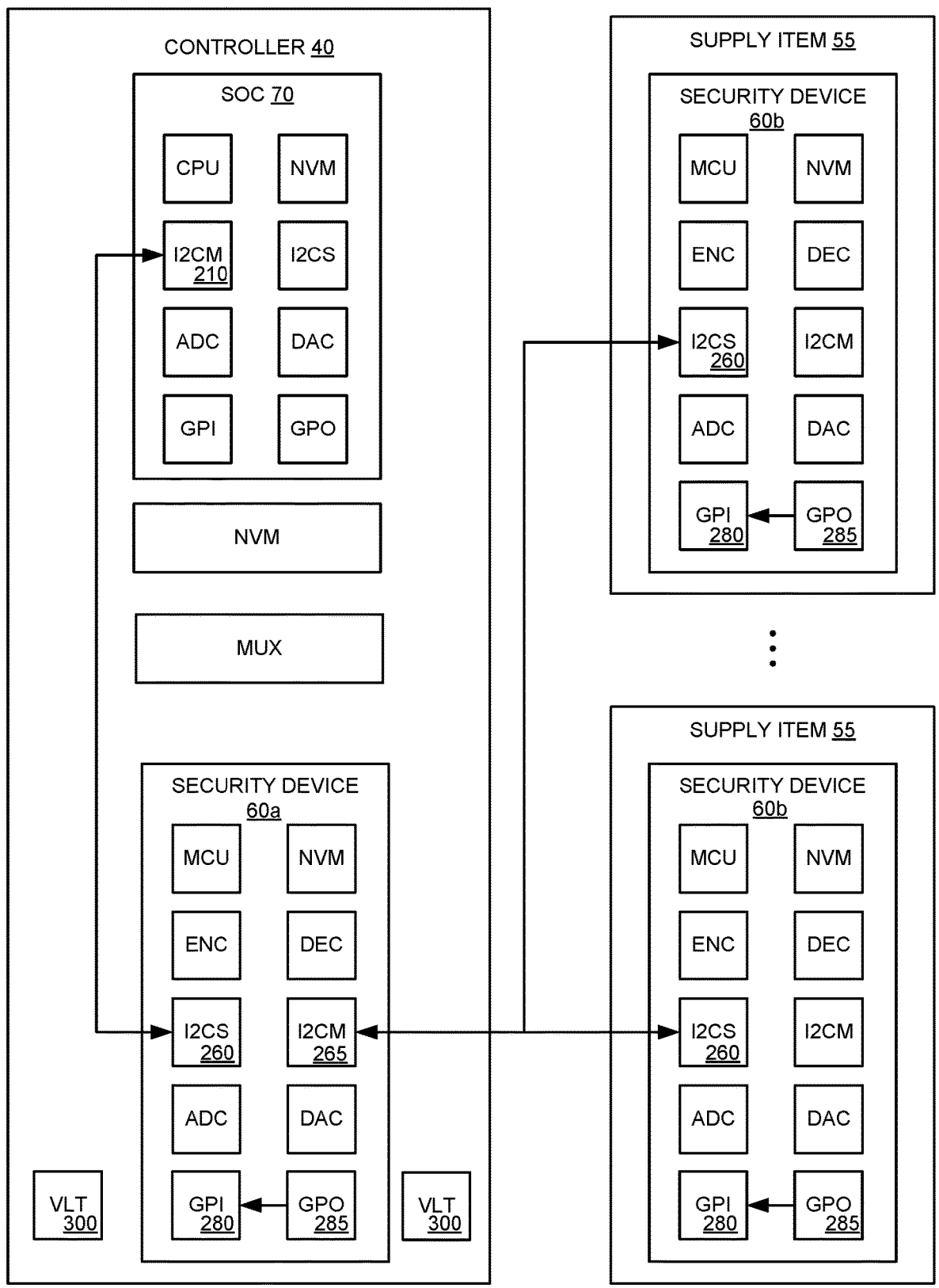
FIG. 18 is a block diagram of an example embodiment where an authentication challenge is sent over an internal GPO-GPI interface of a first security device for self-authentication and a result of the self-authentication is sent from the first security device to a second security device over the serial interface.

In the embodiment shown in FIG. 18, all components are placed and connected as described for the embodiment shown in FIG. 16, but analog authentication differs as follows. Instead of the analog signal being generated and sent by one security device 60 to another security device 60 over the external analog connection (GPO-to-GPI), the analog signal is generated and sent by a security device 60 to itself over an internal analog connection (GPO-to-GPI). In this embodiment, the internal analog signal may be driven from the GPO and received by the GPI over any suitable internal analog connection. In one example, a security device 60 generates an authentication challenge, using any of the methods previously described, and sends the challenge (e.g., a random serial pattern) to itself by serially shifting it across the internal connection of GPO 285 to GPI 280 of security device 60 where it is captured as an actual response by the same security device 60. The same security device 60, then compares the response to the expected response (e.g., equivalent to the challenge or to a calculated derivate of the challenge) and a determination is made whether the security device 60 is authentic or non-authentic using any of the challenge/response verification methods previously described. This enables a security device 60 to self-authenticate itself and communicate the result over the serial interface.

Analog authentication begins with the host SoC 70 commanding, for example, the system security device 60a to self-authenticate itself and to command a supply security device 60b to self-authenticate itself. The supply security device 60b internally connects the output of its GPO unit 285 to the input of its GPI unit 280 and disconnect them from their external connections. The supply security device 60b then generates a random challenge, generate a response, and verify the response as previously described to self-determine its authenticity. The supply security device 60b communicates the result of the of the self-authentication to the system security device 60a over the serial interface and the system security device 60a communicates the results of the self-authentication over the serial interface to the SoC 70 for further action.

The description of the details of the above example embodiments have been described in the context of using wired communication. In a further embodiment, security devices 60 may be connected by wireless technology to transmit and receive challenge and response signals by antenna to implement the authentication methods disclosed herein. In this embodiment, a security device 60 on controller 40 and a security device 60 on a supply item 55 may communicate with each other wirelessly. A security device 60 on a supply item 55 and another security device 60 on another supply item 55 may also communicate with each other wirelessly. In a still further embodiment, a security device 60 may generate an authentication challenge consisting of a random AC signal generated by an amplifier circuit. The AC signal may be random in amplitude and frequency and sent to another security device 60 to be authenticated, where it is received and rectified into a DC signal by a rectifier circuit and then converted from an analog voltage into one or more digital values, as previously described, and finally used as the response to the challenge. The security device 60 may then be authenticated by using any of the verification methods disclosed herein.

With the above example embodiments, systems and methods have been disclosed to authenticate security devices that use analog circuits to generate an analog challenge, generate a digital response, and use an authentication algorithm and a predetermined threshold to perform one-way, mutual, or self-authentication using multiple integrated circuit devices on a controller or on a supply item. It should be understood that many different combinations of these parameters, signals, algorithms, thresholds, protocols, devices, locations, and connections, each with unique characteristics, may be used to implement the concepts disclosed herein and all combinations of these components are considered embodiments of this invention.

The foregoing illustrates various aspects of the invention. It is not intended to be exhaustive. Rather, it is chosen to provide the best mode of the principles of operation and practical application known to the inventors so one skilled in the art can practice it without undue experimentation. All modifications and variations are contemplated within the scope of the invention as determined by the appended claims. Relatively apparent modifications include combining one or more features of one embodiment with those of another embodiment.

The invention claimed is:

1. An imaging system, comprising:
an imaging device having a controller with a first security device chip;
a supply item having a housing,
a second security device chip connected to the housing,
wherein either of the first or second security device chips is configured to receive an authentication challenge from the other of the first or second security device chips including an analog signal when the supply item is installed in the imaging device and when the first or second security device chips receives the authentication challenge, the first or second security device chips is operative to convert the analog signal into one or more digital values and take a derivative of the one or more digital values, and
a second supply item, the second supply item having a second housing and a third security device chip, the third security device chip is configured to receive said authentication challenge from one of the first and second security device chips including said analog signal when the second supply item is installed in the imaging device and when the third security device chip receives the authentication challenge, the third security device chip is operative to convert the analog signal into said one or more digital values and take an arithmetic or logical derivative of the one or more digital values.

2. The imaging system of claim 1, wherein the second supply item further includes first and second analog circuits for converting any digital values into a random analog signal and vice versa.

* * * * *